United States Patent
Aoki

(10) Patent No.: US 7,027,670 B2
(45) Date of Patent: Apr. 11, 2006

(54) CASCADED DEFLECTORS FOR MULTI-CHANNEL OPTICAL SWITCHES, AND OPTICAL SWITCHING MODULES AND METHODS HAVING CASCADED DEFLECTORS

(75) Inventor: Shigenori Aoki, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 136 days.

(21) Appl. No.: 10/688,518

(22) Filed: Oct. 17, 2003

(65) Prior Publication Data

US 2005/0084196 A1    Apr. 21, 2005

(51) Int. Cl.
G02F 1/295    (2006.01)

(52) U.S. Cl. .............. 385/10; 385/8; 385/16; 385/17; 385/20; 385/40

(58) Field of Classification Search .......... 385/8, 385/10, 16, 17, 20, 40

See application file for complete search history.

(56) References Cited

U.S. PATENT DOCUMENTS

| | | | |
|---|---|---|---|
| 3,976,360 A | | 8/1976 | Schroder ............... 350/150 |
| 6,353,690 B1 | * | 3/2002 | Kulishov ................ 385/10 |
| 6,504,966 B1 | | 1/2003 | Kato et al. ............. 385/16 |
| 2003/0059148 A1 | * | 3/2003 | Nishizawa et al. ........ 385/8 |

* cited by examiner

*Primary Examiner*—Brian Healy
*Assistant Examiner*—Jerry Martin Blevins
(74) *Attorney, Agent, or Firm*—Sheppard Mullin Richter & Hampton LLP

(57) ABSTRACT

Cascaded optical deflectors are formed from light deflecting elements of an electro-optical material that are individually controlled according to applied voltage differences across the elements. The shape of the elements are determined by the shape of the electrodes on either side of the electro-optical material, while the refractive index is controlled by the sign and magnitude of a voltage difference applied across the elements. In particular, the invention includes light deflection elements that are tilted with respect to one another and that are individually controlled to provide for the deflection of light in an improved manner.

27 Claims, 10 Drawing Sheets

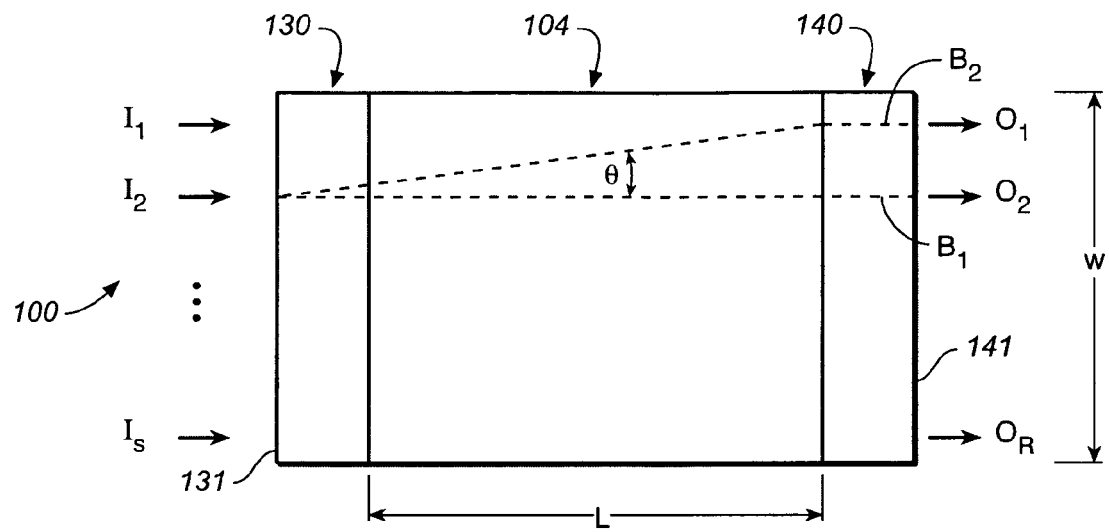
FIG._1
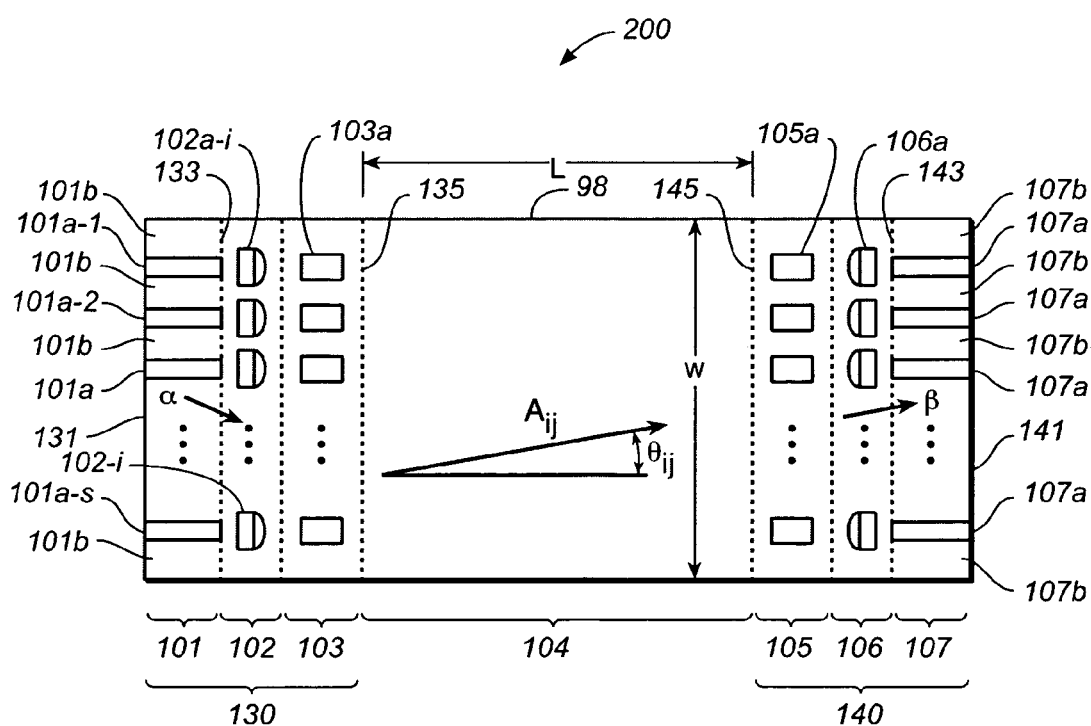
FIG._2

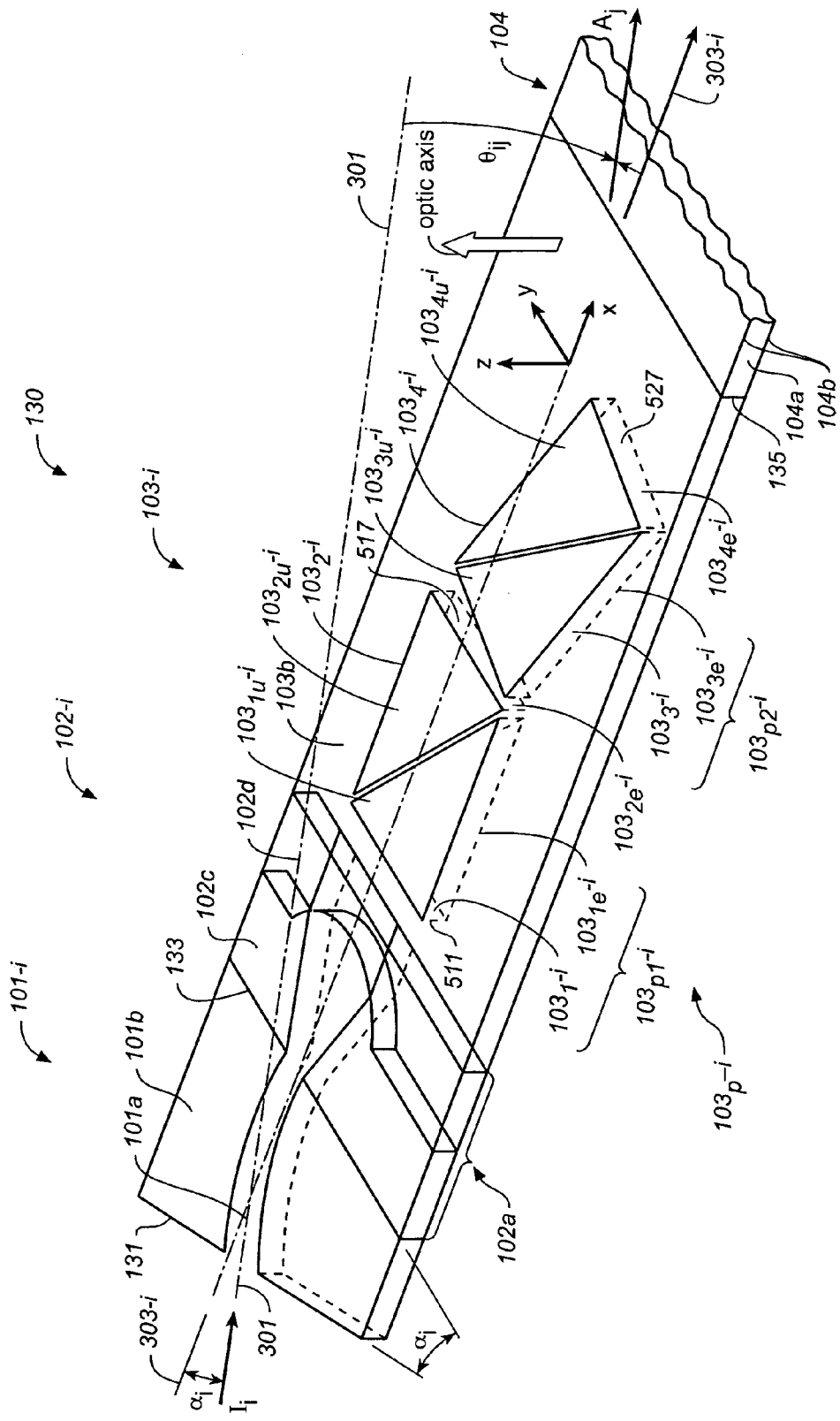
FIG._3

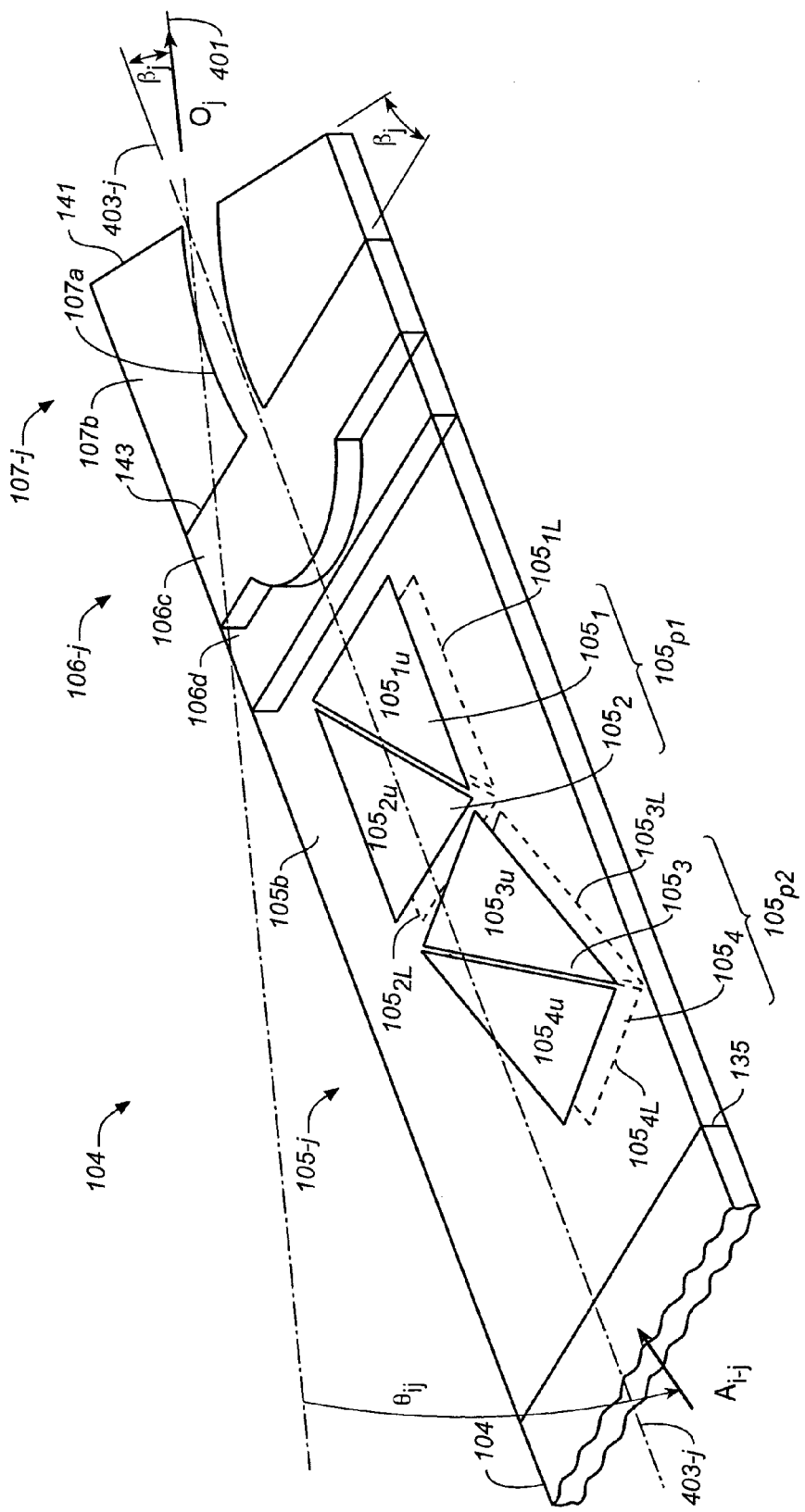
FIG._4

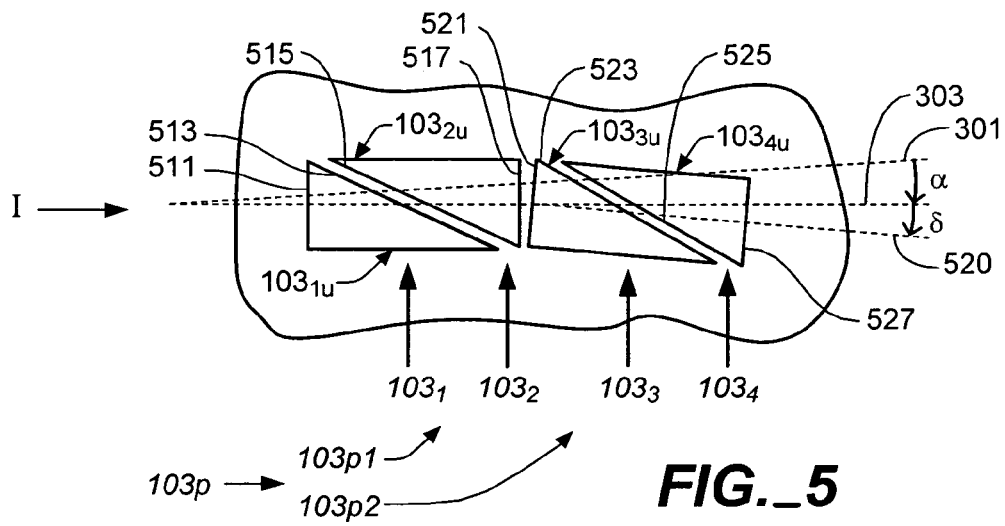
FIG._5
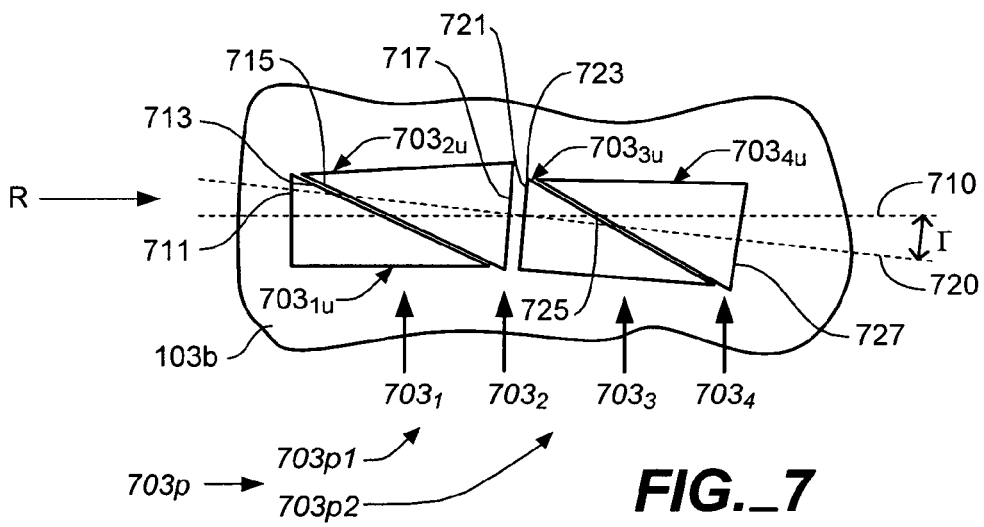
FIG._7
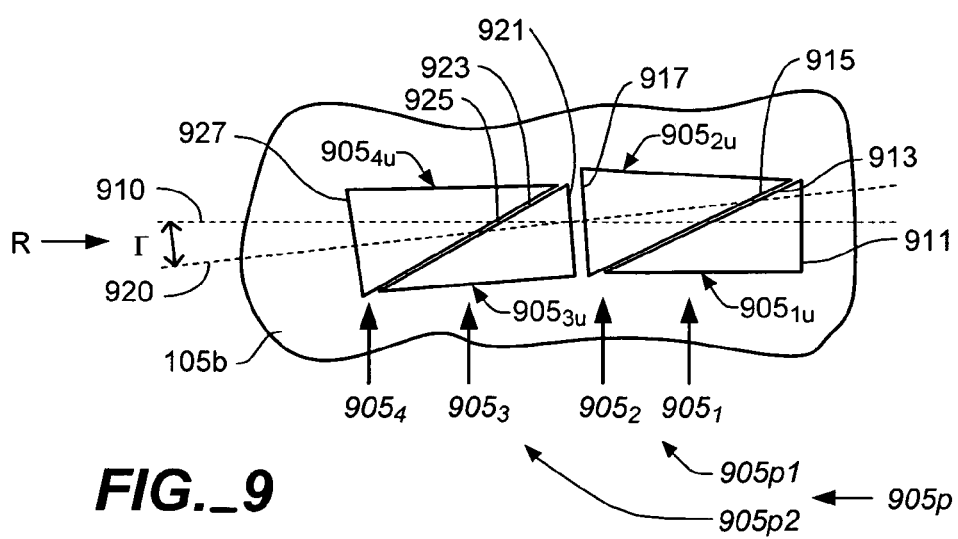
FIG._9

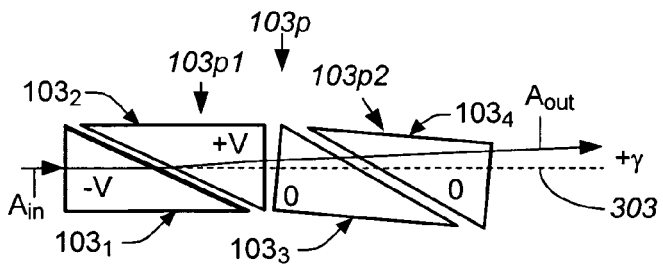
FIG._6A
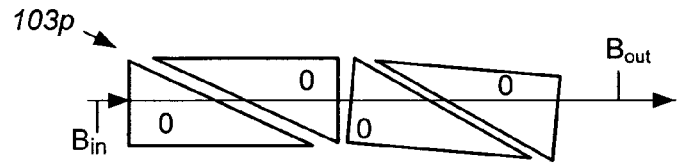
FIG._6B
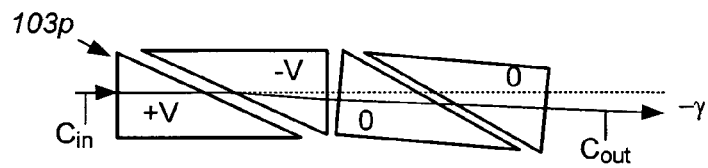
FIG._6C
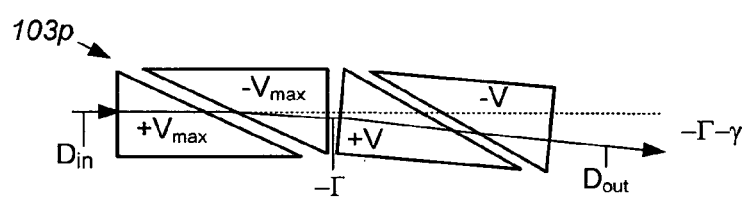
FIG._6D
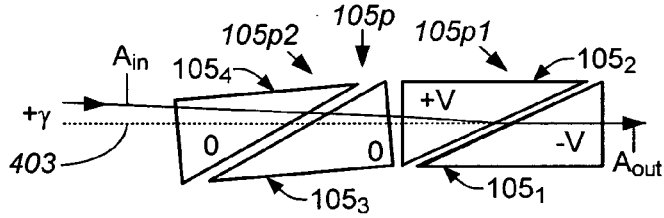
FIG._6E
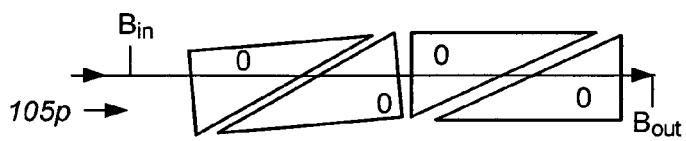
FIG._6F
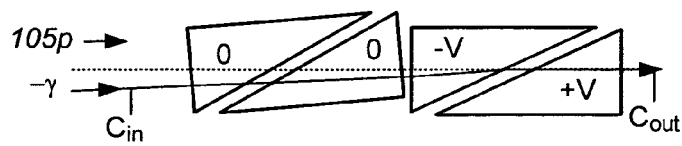
FIG._6G
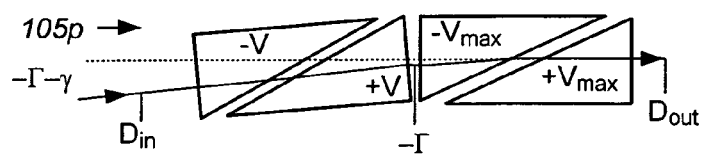
FIG._6H

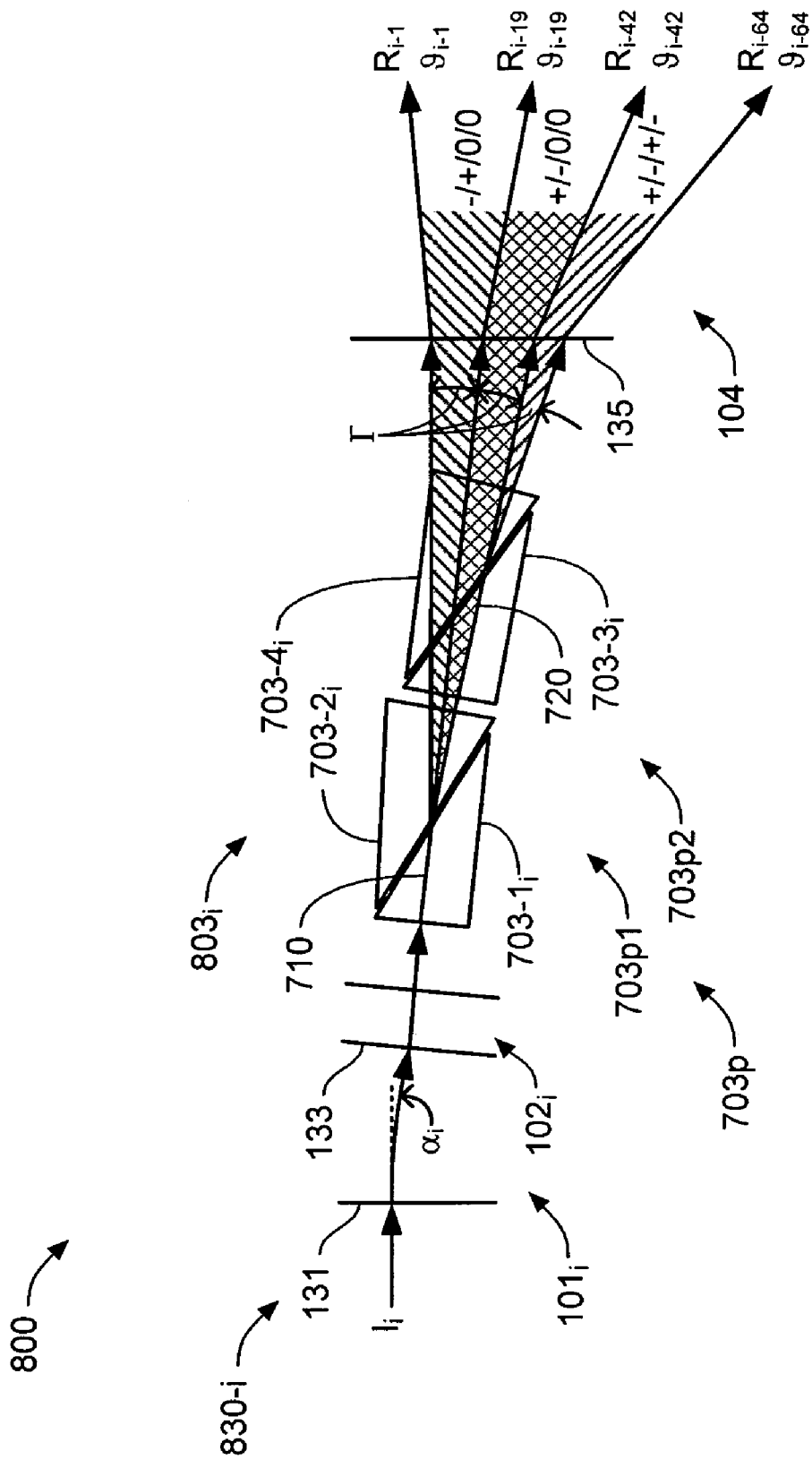
FIG._8

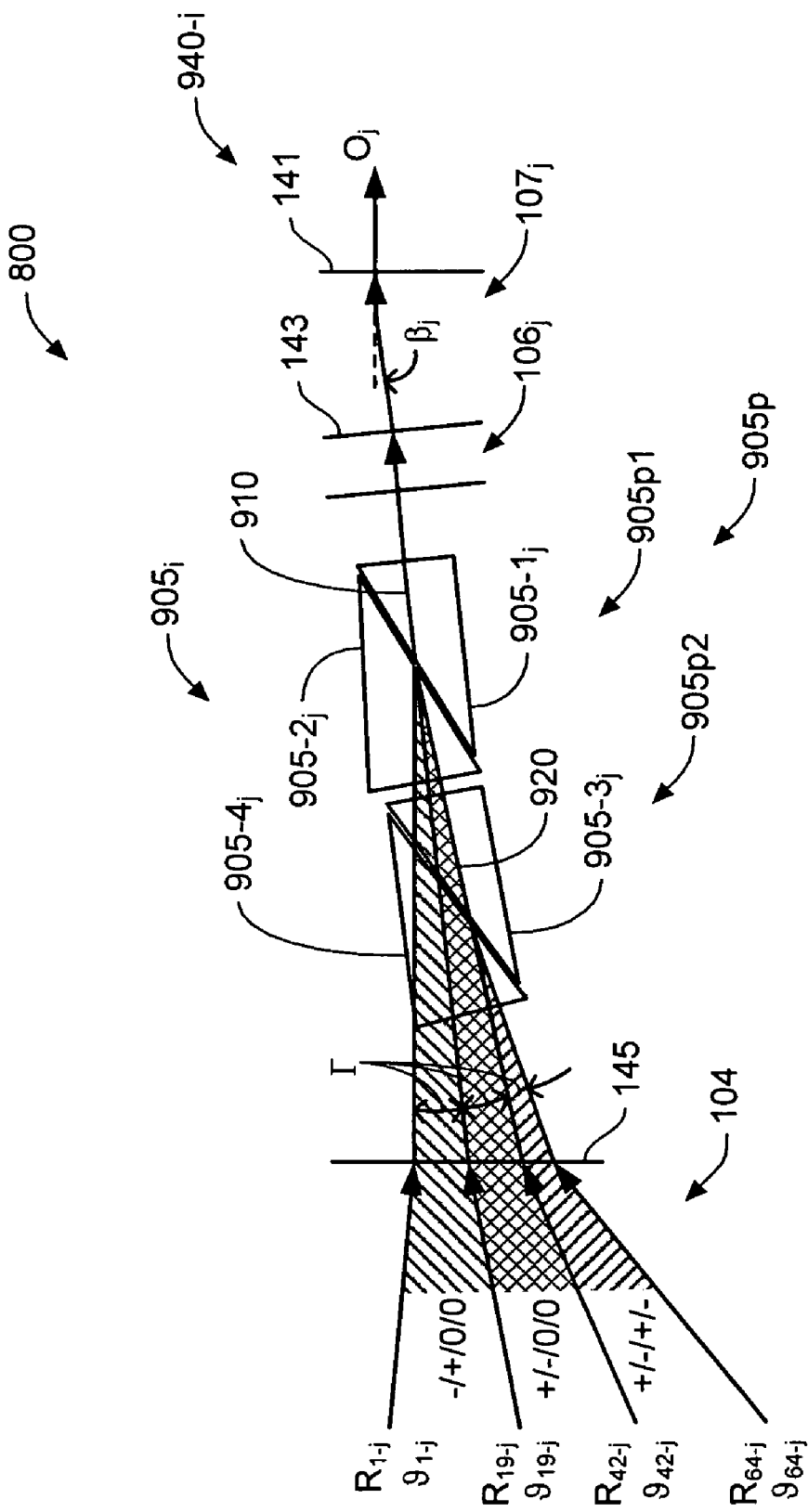
FIG._10

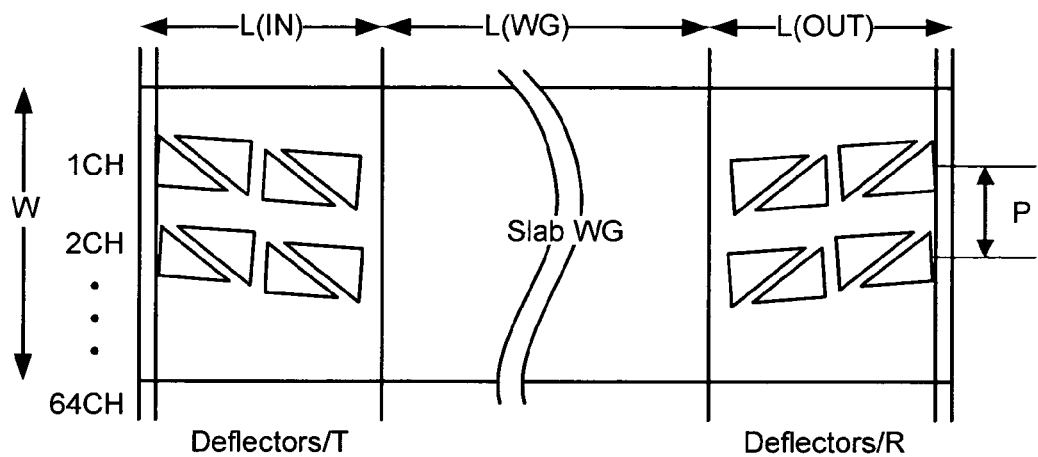
FIG._11
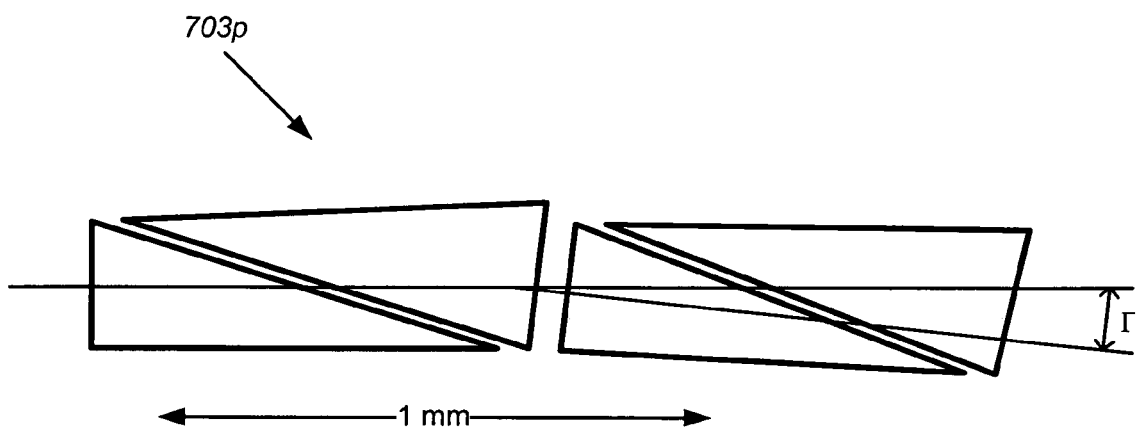
FIG._12

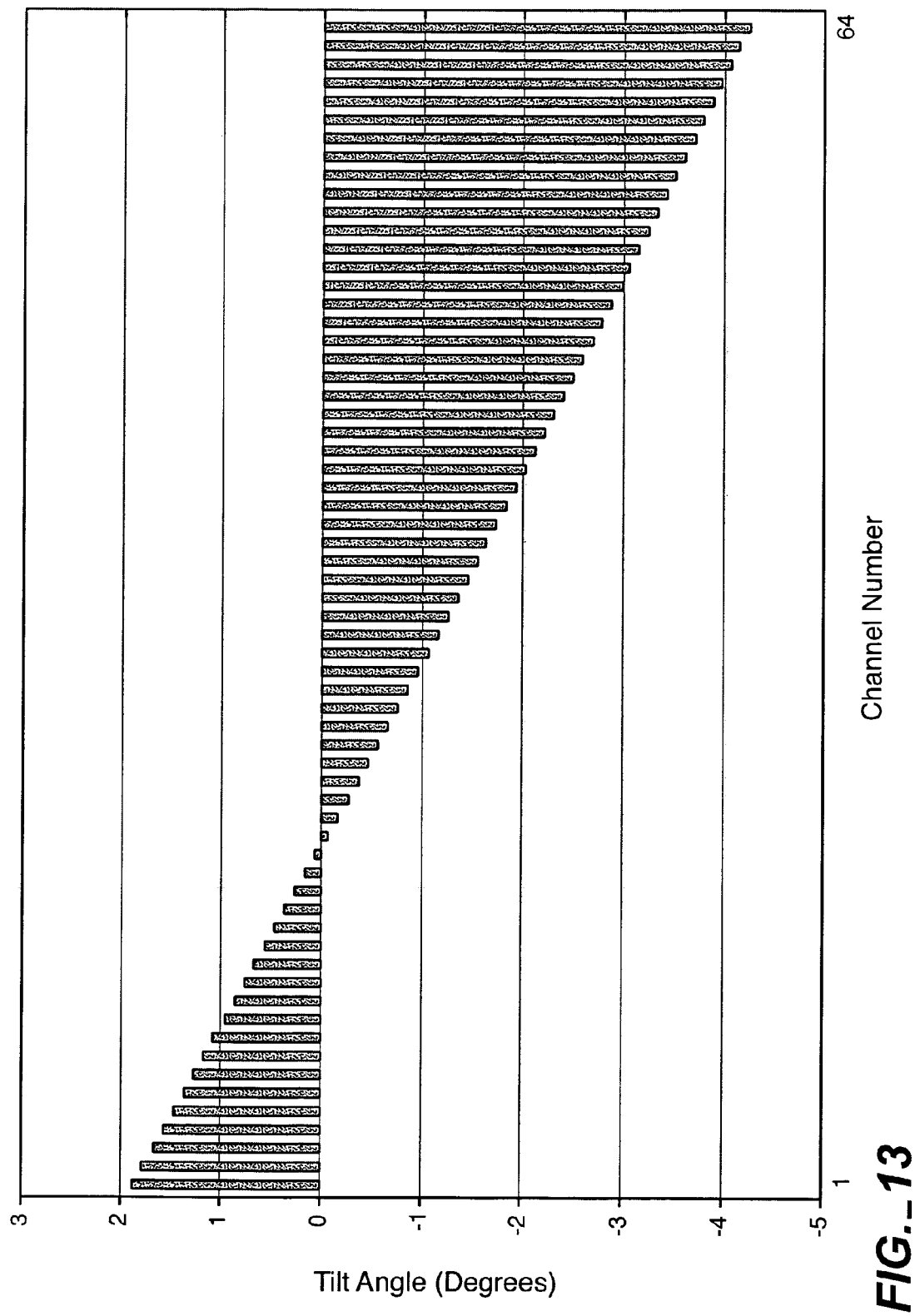
FIG._13

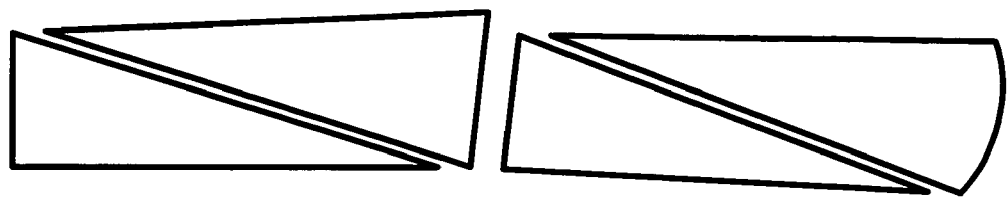
FIG._14

CASCADED DEFLECTORS FOR MULTI-CHANNEL OPTICAL SWITCHES, AND OPTICAL SWITCHING MODULES AND METHODS HAVING CASCADED DEFLECTORS

FIELD OF THE INVENTION

This invention is related to optical switches for use in optical communications networks. In particular, the present invention is directed to optical switching devices having improved switching performance.

BACKGROUND OF THE INVENTION

The growth of optical networks for voice and data communication has created a demand for high data-rate information-transfer capabilities. To enable such transfer capabilities, dense wavelength division multiplexing (DWDM) technology has been developed which allows transfer of multiple wavelength light beams over a single optical fiber enabling data transfer rates up to 40–100 Gb/s. High speed switching and routing devices comprise the core elements of the optical networks and allow dynamic control of the data traveling over the optical network. High data transmission rates impose significant demands on the functionality of the switching devices.

Many types of switches have been proposed, including electrical switches that convert the optical signal to an electrical signal and convert the switched electrical signal back to an optical signal, and optical switches that switch by deflecting light using mirrors. Electrical switches involve conversion steps that make these switches expensive and slow. Prior optical switches include switches having many small, movable mirrors that are controlled to direct optical signals through the switch. These switches have additional problems that limit their use in high speed systems. First, there are reliability problems due to the large number of small movable mirrors. Second, the switching times are limited by the physical movement of mirrors, and are not capable of the high-speed switching required for further optical communications systems.

Optical switches have also been proposed that route light between a plurality of inputs and outputs across a common waveguide. See, for example, commonly assigned U.S. Pat. No. 6,504,966 by Kato et al., incorporated herein by reference. These switches include an input side, the common waveguide, and an output side. Switching is accomplished by the routing any one of the input light beams through the common waveguide to a desired output, and is controlled by coordinated deflections of the light beam at the input and output sides. The input and output sides include a waveguide having an electro-optical material and specially shaped electrodes on opposite sides of the waveguide. The application of voltage differences across the electrodes modifies the refractive index, according to the voltages, within prism-shaped volumes of the electro-optical material. In particular, the electrodes are arranged to form multiple prism pairs. The shape of the prism pairs and the value of the modified refractive index within the prism pairs deflect an appropriately aligned incident beam within an angular deflection range.

Such switches have several limitations that result in a switch that is large or that is complicated to fabricate. For example, the use of only a few prism pairs to deflect light results in an angular deflection range that is small, and thus a long common waveguide is required to switch between one of a number of outputs. Alternatively, the number of prism pairs can be increased to provide a greater angular deflection range. The large number of prism pairs requires a complicated fabrication process and a large optical path for deflecting light.

Therefore, it would be desirable to have a switch for an optical communication system that overcomes the problems with prior optical switches and is faster, more reliable and less expensive to construct than current optical switches. It is also desirable for a switch to be rugged and compact.

SUMMARY OF THE INVENTION

The present invention provides optical switching based on the deflection of light within an optical deflection device using the electro-optic, or EO, effect. These optical deflection devices are extremely fast, and can be used in optical switching modules to handle a large number of input and output channels, e.g., greater than several thousand channels. The optical deflection elements of the present invention act as prisms, which may present planar or curved surfaces to the incident light, that have controllable deflection angles according to the voltage applied to the individual elements. In particular, the present invention provides several deflection elements that are tilted with respect to one another, with non-parallel surfaces, and that are controlled individually or in unison depending on the required angular deflection. The switches of the present invention are capable of deflecting light over a greater angle and with fewer optical deflection elements that those of the prior art.

More specifically, the light deflection elements of the present invention deflect the angle of transmitted light by controllably modifying the refractive index within a volume of an EO material by the application of voltage differences across specially shaped electrodes. The resulting volume of optically modified material acts as a prism to defect light according to applied voltage differences. By providing two sets of deflection elements that are tilted with respect to each other and separately controlled, the light deflection elements of the present invention form a "cascaded" pair of elements that allow for optical switching in optical switching modules that are more compact than those of the prior art.

One embodiment of the present invention provides an optical deflection device for diverting the direction of light rays. The device comprises two pairs of deflecting elements as a first pair of deflecting elements and a second pair of deflecting elements. Each deflecting element includes a portion of a slab waveguide comprising an electro-optical material, and is defined by a pair of electrodes of similar shape on opposite sides of said slab waveguide. The deflecting element deflects light rays in proportion to an applied voltage difference between said corresponding pair of electrodes. Each deflecting element defines surfaces through and perpendicular to said slab waveguide. The adjacent surfaces of the first pair of deflecting elements and adjacent surfaces of the second pair of deflecting elements are in a tilted relationship. A further embodiment of the present invention provides for adjacent surfaces of the first pair of deflecting elements that are planar and parallel, and for adjacent surfaces of the second pair of deflecting elements that are planar surfaces and parallel. In yet another embodiment, each electrode is triangular. Another embodiment provides adjacent surfaces between the first pair of deflecting elements and said second pair of deflecting elements that are planar and parallel.

Another embodiment of the present invention provides an optical deflection device for diverting the direction of light rays. The device comprises two pairs of deflecting elements as a first pair of deflecting elements and a second pair of deflecting elements. Each deflecting element includes a portion of a slab waveguide comprising an electro-optical material, and is defined by a pair of electrodes of similar shape on opposite sides of said slab waveguide. The deflecting element deflects light rays in proportion to an applied voltage difference between said corresponding pair of electrodes. The first pair of deflecting elements has the same shape and is in a tilted relationship with the second pair of deflecting elements. In another embodiment of the present invention, the adjacent surfaces of the first pair of deflecting elements are planar and parallel, and the adjacent surfaces of the second pair of deflecting elements are planar surfaces and parallel. In yet another embodiment, each electrode is generally triangular. In another embodiment the adjacent surfaces between the first and second pairs of deflecting elements are also planar and parallel.

Yet another embodiment of the present invention provides an optical switching module with optical deflection devices that provide for deflection of light beams. One embodiment of the present invention provides an optical switching module having an input side with one or more input channels each adapted to accept an optical input, an output side with two or more output channels each adapted to deliver an optical output, and a common waveguide disposed between the input side and the output side. Each input channels includes one of the input side optical deflection devices that include two pairs of deflecting elements as a first pair of deflecting elements and a second pair of deflecting elements. Each deflecting element includes a portion of a slab waveguide comprising an electro-optical material, and is defined by a pair of electrodes of similar shape on opposite sides of said slab waveguide. The deflecting element deflects light rays in proportion to an applied voltage difference between said corresponding pair of electrodes. Each deflecting element defines surfaces through and perpendicular to said slab waveguide. Adjacent surfaces of the first pair of deflecting elements and adjacent surfaces of the second pair of deflecting elements are in a tilted relationship. The module is able to switch an optical input of one of said one or more input channels by deflecting the light towards a switched optical output channel by applying a voltage to one or both pairs of deflecting elements of the input channel of the optical input. In an alternative embodiment, the output channels have deflecting elements similar to the input channels that compensate the deflection of light by the input channels.

The present invention also provides a method for deflecting light beams in a slab waveguide comprising an electro-optical material according to voltages applied to pairs of electrodes on opposing sides of said slab waveguide. The waveguide has one or more input channels and two or more output channels, and the method includes applying voltage differences to electrode pairs depending on the location of the selected output channel. In another embodiment, deflection occurs by controlling voltages to four electrode pairs. Voltages applied to only two of the electrode pairs deflect light to one of approximately two thirds of the two or more output channels. Voltages applied to all four electrode pairs deflect light of an input to the remaining one third of said two or more output channels.

These features, together with the various ancillary provisions and features which will become apparent to those skilled in the art from the following detailed description, are attained by the optical deflecting device, optical switching modules and method of the present invention, preferred embodiments thereof being shown with reference to the accompanying drawings, by way of example only.

BRIEF DESCRIPTION OF DRAWINGS

The foregoing aspects and the attendant advantages of this invention will become more readily apparent by reference to the following detailed description when taken in conjunction with the accompanying drawings wherein:

FIG. 1 is a schematic diagram showing a general embodiment of an optical switching module of the present invention;

FIG. 2 is a schematic top view of a first embodiment of an optical switching module of the present invention;

FIG. 3 is a perspective top view of a channel of an input side of the optical switch module of FIG. 2;

FIG. 4 is a perspective top view of a channel of an output side of the optical switch module of FIG. 2;

FIG. 5 is a top view of an input side deflector of the optical switch module of FIG. 2;

FIGS. 6A–6D are top views of the input side deflector of FIG. 3 illustrating, in general, a range of deflections caused by the deflectors of the present invention, with the first, second, third, and fourth electrodes having the following voltage differences: −/+/0/0 (FIG. 6A); 0/0/0/0 (FIG. 6B); +/−/0/0 (FIG. 6C); and +/−/+/− (FIG. 6D);

FIGS. 6E–6H are top views of the output side deflector of FIG. 4 illustrating, in general, a range of deflections caused by the deflectors of the present invention, with the first, second, third, and fourth electrodes having the following voltage differences: −/+/0/0 (FIG. 6E); 0/0/0/0 (FIG. 6F); +/−/0/0 (FIG. 6G); and +/−/+/− (FIG. 6H);

FIG. 7 is a top view of a second input side deflector embodiment;

FIG. 8 is a top view illustrating the range of light deflection caused by the input side deflector of FIG. 7;

FIG. 9 is a top view of a second output side deflector embodiment;

FIG. 10 is a top view illustrating the range of light deflection caused by the output side deflector of FIG. 9;

FIG. 11 is a schematic of a switching module of Example 1;

FIG. 12 is a schematic of the prisms of Example 1; and

FIG. 13 is a graph of the channel-to-channel tilt of the prisms of Example 1.

FIG. 14 is shows an alternate embodiment of the present invention where one side of one of the deflector electrodes has a curved shape.

Reference symbols are used in the Figures to indicate certain components, aspects or features shown therein, with reference symbols common to more than one Figure indicating like components, aspects or features shown therein.

DETAILED DESCRIPTION

In general, the light deflection elements of the present invention use EO-induced refractive index changes to deflect an optical beam, also referred to as a light beam or an optical signal. The element can be incorporated into an optical switching module, with the elements capable of directing the optical beam incident at an input port of an optical switching module to a selected output port through a waveguide that is common to all the signals. The tilted arrangement of the elements, as described in detail below, provides increased deflection within individual light deflector portions of the switch, which in turn provides for a reduced optical switch module size.

Referring now to the drawings in combination with the description hereinafter presented, there is illustrated and described an optical switching apparatus that is particularly suited to fast, high density, compact switching of optical signals between I/O channels. FIG. 1 is a schematic diagram showing a general embodiment optical switch module 100 of the present invention. Module 100 has an input side 130, a common waveguide 104, and an output side 140. Module 100 has a width W, and common waveguide 104 has a length, L, between input side 130 and output side 140. Module 100 is a planar device with a depth, D, which is into the plane of FIG. 1 and is not shown, that is large enough to include the planar waveguides and associated optics and electronics described herein.

Module 100 accepts inputs as light beams or optical inputs I, at a plurality of input channels, and switches the signals contained in the input channels to one of one or more optical outputs, O, or output channels. As shown in FIG. 1, inputs I include s individual inputs $I_i$, where the index i is from 1 to s (i=1, 2, . . . , s), and outputs O include r individual outputs $O_j$, where the index j is from 1 to r (j=1, 2, . . . , r). More specifically, input side 130 has an input face 131 adapted to accept optical inputs $I_i$, and to selectively deflect the accepted inputs through common waveguide 104 towards outputs $O_j$ at output side 140. Output side 140 is adapted to receive the selectively deflected inputs $I_i$ and direct the light through output face 141 as output $O_j$.

The inputs $I_i$ and outputs $O_j$ are laterally spaced along input face 131 and output face 141. Faces 131 and 141 can be parallel, or may have some channel-to-channel variations. The spacing, or pitch, is preferable constant between adjacent inputs, for example between input $I_i$ and input $I_{i+1}$, and between adjacent outputs, for example between output $O_j$ and output $O_{j+1}$.

Input side 130 and output side 140 are separated by common waveguide 104 having a length L. Switching between input i and output j is performed optically by deflecting light of the i input channel to the j output channel. Each input is individually controlled to direct an input to one of the outputs such that switching is accomplished for as many as all of the input channels at the same time. Note that each input channel may contain multiple signals, as, for example, when using DWDM.

The number of input channels, r, and output channels, s, can be equal, resulting in a symmetric switch, or can be different, resulting in an asymmetric switch. The number s, for example, can be as small as 2 channels, or can be as large as 128 or more channels. An example of the use of such module 100 with r=s=M, is as a M×M channel symmetric cross-connect switch. Alternatively, r and s can differ and switch module 100 could be used as an asymmetric cross-connect switch or as a switch as part of an add-drop device.

An example of the switched transmission of light beams (in general, B) across module 100 is shown in FIG. 1 as the paths of two selected beams $B_1$ and $B_2$. These beams are illustrations of two possible switching configurations, and are not provided simultaneously. In one instance, first beam $B_1$ is switched between an input $I_2$ and an output $O_2$, where input $I_2$ and an output $O_2$ are coaxial. Since the input and output are coaxial, beam $B_1$ is transmitted without deflection (along a straight path) through input side 130, common waveguide 104, and output side 140. In another instance, second beam $B_2$ is switched between input $I_2$ and an output $O_1$, where input $I_2$ and an output $O_1$ are not coaxial. In this case, beam $B_2$ must be deflected at some point in module 100. As described subsequently, module 100 deflects light in input side 130 and in output side 140, but not within common waveguide 104. Thus, to switch from input $I_2$ to output $O_1$, module 100 deflects the input by an angle θ within input side 130, and compensates by deflecting beam $B_2$ by an equal an opposite angle −θ within output side 140 so that the light beam emerges traveling parallel to its incident path.

In general, module 100 optically switches from one input to another through mutually compensated and coordinated deflections in sides 130 and 140 through an angle θ between the input and output sides. The angle θ necessary to achieve the necessary deflection depends on the spacing length L and the lateral spacing of inputs I along input face 131 and outputs O along output face 141. A small maximum deflection angle thus requires a longer wavelength to switch between outputs of a given spacing. The amount of deflection depends on the refractive indices and the geometry of any refractive or reflective features within module 100, including, but not limited to, lenses, waveguides, mirrors, or other optical features that are permanently or controllably within the module. The deflection of light between the various inputs and outputs requires that the maximum angle θ be as large as possible, while maintaining beam integrity across module 100, and that is controllable to direct the light to the proper output channel. The present invention is directed to having matched input and output sides 130 and 140 that permits deflections angles to direct light from any input to any output over a small length L.

The input side 130 and output side 140, as described subsequently, include EO materials that can be controllably activated to deflect light beams, such as beams B, by the modification of the refractive index of the EO material. The use of EO materials for optical switches is known and is described, for example, in commonly assigned U.S. Pat. No. 6,504,966 by Kato et al.

Input side 130 and output side 140 include deflection elements, described subsequently, preferably made from waveguides containing $LiNbO_3$ (lithium niobate, hereinafter termed as "LN") with a transition metal (e.g., Ti) in-diffused, and having top and bottom electrodes that define a preferably generally prism-shaped volume within the EO material. It is to be understood that LN may be replaced by any material with a strong electro-optical coefficient. Alternative switching element materials include $PbZr_xTi_yO_3$ (lead zirconate titanate), hereinafter termed as "PZT," and lanthanum-modified PZT, hereinafter termed as "PLZT." The material of the switching element may be either a bulk or thin film material and the electrodes may be made to define various shapes, such as prisms, gratings, various combinations and arrays of prisms and gratings, etc. Thus, it is contemplated that switching elements of the present invention are not limited to PZT, PLZT, or LN, but may employ any other suitable electro-optic material to be formed as a wafer. In addition, the switch may be formed on a silicon substrate, or on other suitable substrate, e.g., glass plate, printed circuit board, etc., as required for production of the optical switch module.

Common waveguide 104 is made from a material selected to transmit a beam between input side 130 and output side 140. Waveguide 104 may be formed integrally with the input side 130 and output side 140 on a single substrate, or can be formed separately and assembled into an optical switch. As described subsequently, the optical properties of the common waveguide, such as the refractive index and birefringence, may be selected to increase the deflection of the EO device, reduce the effects of EO device birefringence, or both. An increased deflection through common waveguide 104 allows for a shorter common waveguide (smaller L for the same input and output pitch), and thus a more compact module 100.

The portions of optical switch module 100 that are not formed of an EO material may be formed from a highly transparent, highly heat-resistant polymer such as a fluorinated polyimide, or from quartz or glass. An organic and/or inorganic hybrid may also be used. Suitable methods for forming films of polymer systems include spin coating, dip coating, spray coating, or vapor phase growth processes such as evaporation polymerization or CVD. For glass systems, sputtering, evaporation, CVD or the like may be employed, and when a sol-gel method is used, spin coating, dip coating or spray coating may be employed. Light waveguides may be also formed by depositions of a lower cladding layer, a core layer, and a top-cladding layer. The refractive index (RI) of the core layer is set to higher than the RI of the cladding layers.

First Embodiment Optical Switch Module

A first embodiment of the present invention is shown in FIG. 2 as an optical switch module 200. The input side 130, common waveguide 104, and output side 140 of the first embodiment include the following. Input side 130 has an input side optical waveguide portion 101 from input face 131 to an input waveguide end 133, an input side collimating portion 102, and an input side deflecting portion 103. Output side 140 includes an output side deflecting portion 105, a focusing portion 106, and an output side optical waveguide portion 107 from an output waveguide end 143 to output face 141. Waveguide 104 has a waveguide input 135 and a waveguide output 145 with a separation L. Common waveguide 104 has a width W measured perpendicular to the direction of L and parallel to input face 131 and output face 141.

Module 200 may be used to controllably switch light beams or rays between a selected input channel, referred to by the index "i," and a selected output channel, referred to by the index "j", Input side portions 101, 102, and 103 have separate components for each input $I_i$, referred to as input side optical waveguide portion $101_i$, input side collimating portion $102_i$, and input side deflecting portion $103_i$, and output side portions 105, 106, and 107 have separate components for each output $O_j$, referred to as output side deflecting portion $105_j$, focusing portion $106_j$, and output side optical waveguide portion $107_j$. Each input and output portion $101_i$, $102_i$, $103_i$, $105_j$, $106_j$, and $107_j$ can differ from the other input and output portions to provide transmission of signals from input i to output j. As described subsequently, deflections from input $I_i$ to output $O_j$ result from a combination of predetermined deflections, such as through bent waveguides of input side waveguide portion $101_i$ and output side waveguide portion $107_j$, respectively, controllable deflections in input side deflecting portion $103_i$ and output side deflecting portion $106_j$, respectively, and refractive deflections across material interfaces between the input side deflecting portion and common waveguide 104 at input interface 131 and across material interfaces between the common waveguide and output side deflecting portion at output interface 141.

Input side optical waveguide 101 is constructed of a plurality of optically transparent layers for accepting a corresponding one of the plurality of inputs $I_i$. The layers may be formed by standard lithographic techniques. The layers of individual waveguides 101-i are sometimes referred to as "core" 101a–i and clad layers 101b–i . Each comprises a three-layer stack with the core layer being sandwiched between the two cladding layers. This three-layer structure confines the optical beams from input $I_j$ within the corresponding respective core layers 101a–i due to the difference of refractive index between the core and the clad layer. Each core 101a–i is perpendicular to input face 131. However, various ones of cores 101a–i can have different curvatures along their length to bend light as it propagates through the core.

FIG. 3 is a top perspective view of input side 130 of module 200 for one of the a particular input channel, "i." A line 301 is perpendicular to input face 131 and aligned at the position of input $I_i$. Input $I_i$ enters input side 130 perpendicular to face 131 and is deflected to propagate in common waveguide 104 as signal $A_{i\text{-}j}$. Each core 101a–i , and hence waveguide 101-i, curves from the perpendicular of input face 131, through an angle $\alpha_i$ perpendicular to input waveguide end 133. In general, each of the s input channels may have a different angle. As will be discussed subsequently, the angles α are small, preferably on the order of several degrees or less, and thus the schematic of FIG. 3 shows an angle $\alpha_i$ that is greatly exaggerated for illustration purposes.

Also shown in FIG. 3 is line 303-i, which is perpendicular to the input waveguide end 133 and within the plane of module 200, and indicates an optical axis for collimating portion 102-i, and input side deflection portion 103-i. Since line 301 is perpendicular to input face 131 and line 303-i (in general, lines 303) is perpendicular to input waveguide end 133, lines 301 and 303-i also intersect at angle $\alpha_i$. As discussed subsequently, each angle $\alpha_i$ is selected in combination the input side deflection portion 103 of each input $I_i$ to provide the switching of the input to any one of the outputs $O_j$.

Collimating portion 102 has a collimating portion 102-i for each input channel comprised micro-lenses or collimating lenses 102a–i (or, in general, 102a). Light diverging from the exit of optical waveguide 101-i is collimated by collimating lenses 102a–i. Each collimating lens 102a–i is either integrally formed with, or is located at a position slightly apart from the end portion of respective optical waveguides 101a–i, and has an optical axis indicated as line 303-i.

Alternatively, mirrors, prisms or other lens arrangements can be provided within or as a replacement to input side optical waveguide 101 and collimating portion 102 to deflect inputs $I_i$ by angle $\alpha_i$ and focus the light into input side portion 103.

Input side deflection portion 103 has a portion 103-i for each input channel. Each deflecting portion 103 has four light deflection elements—a first element $103_1$ a second element $103_2$, a third element $103_3$, and a fourth element $103_4$, or in general, elements $103_k$, where k ranges from 1 to 4 corresponding to one of the four elements. Each element $103_k$ comprises a prism with a generally right triangle shape when viewed perpendicular to the direction of light propagation. The light deflection elements of specific input side deflection portion 103-i are indicated as $103_1$-i, $103_2$-i, $103_3$-i, and $103_4$-i, or in general, $103_k$-i. Light 103k are positioned at a location slightly apart and along axis 303 from respective collimating lens 102a. Light deflection elements $103_k$-i deflects or changes the propagation direction of light signals of channel i by modifying the refractive index within a volume of waveguide 103b using either quadratic or linear electro-optic effects controlled by electrical signals to elements $103_k$-i. Light deflection elements $103_k$ are thus prisms of controllable refractive index within waveguide 103b. Light propagation is refracted or reflected by the elements depending on the refractive index change and the geometries involved. It is preferred that light deflection elements $103_k$ are refractive elements.

Each light deflection element $103_k$ comprises a pair of electrodes that define the shape of the element in waveguide $103b$. Specifically, $103_1$ is associated with an upper electrode $103_{1U}$ and a lower electrode $103_{1L}$, element $103_2$, is associated with an upper electrode $103_{2U}$ and a lower electrode $103_{2L}$, element $103_3$, is associated with an upper electrode $103_{3U}$ and a lower electrode $103_{3L}$, and element $103_4$, is associated with an upper electrode $103_{4U}$ and a lower electrode $103_{4L}$.

The common optical waveguide 104 is constructed as a slab-type waveguide to confine light as it is transmitted from input side 130 to output side 146. In the embodiment of FIG. 2, this is represented by the plane of width, W, and length, L. Common optical waveguide 104 transmits light that passes through the input side light deflection portion 103 to the output side light deflection portion 105. Thus, a plurality of optical signals may pass simultaneously through common optical waveguide 104.

In a preferred embodiment, the refractive indices of waveguides $103b$ and $105b$ are the same, and differ from the refractive index of common waveguide 104. Specifically, there is preferably a change in the refractive index across waveguide input 135, with the refractive index of waveguide 104 less than the refractive index of waveguide $103b$, and there is a change in the refractive indices across waveguide output 145, with the refractive index of waveguide 104 less than the refractive index of waveguide $105b$. This combination of refractive indices results in an increase in the angle of propagation of light rays as they are transmitted through waveguide input 135, and an equal and opposite decrease in the angle of propagation of rays as they continue being transmitted through waveguide output 145.

In an alternative embodiment module 200, the refractive index of waveguides $103b$, 104, $105b$ are the same and thus light passes from input side 130 through waveguide 104 at waveguide input 135 and into output side 140 at waveguide output 145 with no refractive change in the angle of light beam propagation.

It is also preferred that common waveguide 104 material have a birefringence that provides for approximately parallel beam propagation of light that is birefringently refracted in input side deflection portion 103.

In a preferred alternative embodiment, waveguides $103b$ and $105b$ are PLZT with a refractive index of approximately 2.5, and common waveguide is a polymer with a refractive index of approximately 1.57. With this combination or optical properties, a ray incident on the interface between waveguide $103b$ to waveguide 104 will emerge into waveguide 104 at a larger angle, and the angle of propagation will be compensated when passing from waveguide 104 into waveguide $105b$. In other words, light rays will be deflected such that the rays in waveguide $103b$ are parallel to the transmitted ray in waveguide $105b$. The use of variations of refractive index between input and output sides and a common waveguide is discussed in commonly owned U.S. patent application Ser. No. 10/330,997, incorporated herein by reference, which also discusses the variation of refractive index with the polarity of light, specifically the ordinary and extraordinary rays, and the selection of waveguides with optical properties that provide an increase of the deflection of beams, correction of core birefringence, or both.

Module 200 switches light beams or rays between a selected input channel $I_i$ and a selected output channel $O_j$ through the coordinated deflection of light beams at input side 130 and output side 140 and the transmission of the deflected light beams through common waveguide 104. As shown in FIG. 2, for example, switching of input i to output j occurs by deflecting light from input $I_i$ into common waveguide 104 as beam $A_{i-j}$ at an angle $\theta_{i-j}$ relative to the parallel input and output faces 131 and 141. Beam $A_{i-j}$ is then deflected by an angle $-\theta_{i-j}$ at the output side 140 to form output signal $O_j$. The deflection of light by angle $\theta_{i-j}$ through input side 130 and into common waveguide 104 is a combination of the angle $\alpha_1$ deflection by waveguide 101-i, a controllable angle deflection by input side deflection portion 103-i, and a further refraction at waveguide input 135 according to the angle incident on the waveguide inputs and the change in refractive index between waveguides $103b$ and 104.

The deflection angle within deflection portions 130 and 140 directing input i to output j through angle $\theta_{i-j}$ through common waveguide 104 can be computed according to the refractive indices of the various optical components, the angles between the light rays and the interfaces between the components, and the distance the rays trace through the various components. Ray tracing procedures, including the effect of birefringence on polarized light refraction are well known in the art and can be used to determine the required deflection angles through input side 130 into waveguide 104 and from waveguide 104 through output side 140.

FIG. 4 is a perspective top view of output side 140 for one output channel, "j," of module 200. Output side 140 receives light beam $A_{i-j}$ at waveguide output 145 and deflects the beam to emerge as output signal $O_j$. The components of output side 140 include optical components in the opposite order to light transversing input side 130. A line 401 indicates a perpendicular to output face 141, which is aligned at the position of output $O_j$. Each core 107a-j, and hence waveguide 107-j, curves from the perpendicular of output face 141, through an angle $\beta_j$ perpendicular to input waveguide end 143. As with the input side, each of the s output channels may have a different angle, indicated in general as $\beta$. Also shown in FIG. 4 is line 403-j, which is perpendicular to the output waveguide end 143 and indicates an optical axis for focusing portion 106-j, and output side deflection portion 105-j. Since line 401 is perpendicular to output face 141 and line 403-j (in general, lines 403) is perpendicular to output waveguide end 143, lines 401 and 403-i also meet at angle $\beta_i$. Beam $A_{i-j}$ exits optical waveguide 104 at waveguide output 145. As noted above, there is an increase in the refractive index across waveguide output 145, and light rays are deflected towards the normal to waveguide output 145 according to Snell's Law.

Light from beam $A_{i-j}$ then enters output side light deflection portion $105_j$. Output side deflection portion 105 is a mirror image of input side deflection portion 103. Specifically, each output side deflection portion 105 has four light deflection elements that each form a prism having a generally right triangular shape when viewed normal to the plane of light propagation—a first element $105_1$ a second element $105_2$, a third element $105_3$, and a fourth element $105_4$, or in general, elements $105_k$. The light deflection elements of output side deflection portion 105-j (the $j^{th}$ output channel) are indicated as $105_1$-j, $105_2$-j, $105_3$-j, and $105_4$-j, or in general, $105_k$-j. Light deflection elements $105_k$ are positioned at a location slightly apart and along axis 403 from respective focusing lens 106a. Light deflection elements $105_k$-j deflect or changes the propagation direction of light signals of channel j by controlling electrical signals to elements $105_k$-j by using either quadratic or linear electro-optic effects.

Each light deflection element $105_k$ comprises a pair of electrodes that define the shape of the element in waveguide $105b$. Specifically, $105_1$ is associated with an upper electrode $105_{1U}$ and a lower electrode $105_{1L}$, element $105_2$, is associated with an upper electrode $105_{2U}$ and a lower electrode $105_{2L}$, element $105_3$, is associated with an upper electrode $105_{3U}$ and a lower electrode $105_{3L}$, and element $105_4$, is associated with an upper electrode $105_{4U}$ and a lower electrode $105_{4L}$.

Note that the elements $103_k$ are approximate mirror images of the elements $105_k$. Thus the geometrical configuration of the elements is approximately symmetric about a centerline between input side 130 and output side 140. Light passes through elements of input side 130 in the order $103_1$–$103_2$–$103_3$–$103_4$, and through the elements of the output side 140 in the order $105_4$–$105_3$–$105_2$–$105_1$.

Each light deflection element $105a$ controllably deflects light from beam $A_{i-j}$ towards focusing portion 106. Focusing portion 106 has focusing lenses $106a$-j for each output channel j having an optical axis $403$-j at an angle $\beta_j$ to output face 141. Focusing lenses $106a$ focus the light signals from respective ones of light deflection elements $105a$ and direct the signals to the output optical waveguides $107a$. As discussed above, waveguides $107a$ further deflects the light through the angle $\beta_j$ such that it is perpendicular to output face 141. Each of the s channels may have a different angle. Thus light entering output waveguide end 143 at an angle $\beta_j$ to input face 131 is curved by core $107a$–$i$ to exit optical waveguide 107 perpendicular output face 143.

Details of the collimating lens portion 102, the input side light deflection element portion 103, the output side light deflection element portion 105, and the focusing portion 106 in optical switch module 100 are shown in FIGS. 2, 3, and 4. Each of the collimating lenses $102a$ is preferably a two-dimensional lens comprised of two portions $102c$ and $102d$, with each portion having a different refractive index. The portions $102c$, having a relatively higher refractive rate (a convex lens portion), are preferably formed by the same material used for forming the optical waveguide or core $101a$. Portions $102d$, having a relatively lower refractive index are preferably comprised of openings filled with air or other gas, or any suitable material (e.g., gels).

The focusing lenses $106a$ are similar in structure to the collimating lenses $102a$. Each focusing lens includes a portion (a convex lens portion) $106c$ having a high refractive rate and a portion $106d$ having a low refractive rate. Preferably, the refractive direction of focusing lenses $106a$ is opposite to the refractive direction of collimating lenses $102a$, and are preferably formed by the same material used for forming the optical waveguide or core $107a$.

The output side of waveguide 107 is similar to the input side of waveguide 101 and is constructed of a plurality of optical layers, so called cores, $107a$–j, and clad layers $107b$-j which form three-layer structures $107$-j in the same manner and corresponding to each of one of the plurality of outputs $O_j$. Cores $101a$–$i$ and $107a$–$j$ are laterally spaced in the direction of width W, preferably at an even spacing. Each core $107a$–$j$ is perpendicular to output face 141. As with cores $101a$–$i$, various ones of cores $107a$–$j$ can have different curvatures along their length to bend light as it propagates through the core.

Alternative embodiments include the use of mirrors, prisms or other lens arrangements within or as a replacement to focusing portion 106 and output side optical waveguide 107 to deflect light by an angle $\beta_j$ and focus. light into output $O_j$.

Additional details of input side 130 will first be discussed with reference to FIG. 3 and FIG. 5, which is a top view of input side deflection portion 103-i, with the direction of signal propagation indicated by the input I. As shown in FIG. 3, all input signals I are introduced to input side 130 along a planar input face 131. Each input signal $I_i$ enters module 200 perpendicular to input face 131, as indicated by line 301, and is first deflected through a fixed angle $\alpha_i$, as indicated by line 303-i. The angle $\alpha_i$ varies such that the corresponding input side deflecting portion 103-i, which has a limited deflecting range, is capable of deflecting the signal to any one of the outputs. As shown in FIG. 3, each light deflection element $103_k$ comprises slab-type waveguide $103b$ made from a material having electro-optic properties, upper electrode $103_{kU}$ disposed on one side of the waveguide and lower electrode $103_{kL}$ disposed on the opposite side of waveguide $103b$. Preferably waveguide $103b$ is common to each of the deflection elements $103_k$ and the space between the deflection elements. The four light deflection elements $103_1$ through $103_4$ are arranged in two deflection element pairs $103p$ comprising a first prism pair $103p1$ including the first and second light deflection elements $103_1$ and $103_2$, and a second prism pair $103p2$ including the third and fourth light deflection elements $103_3$ and $103_4$. As is well known in the art, electro-optic materials change optical properties by the application of a suitable electric potential, and thus the application of voltages to opposing electrodes $103_{kU}$ and $103_{kL}$ changes the optical properties within the waveguide near the electrodes.

According to an aspect of the present invention, the pairs of upper and lower electrodes $103_{kL}$ and $103_{kU}$ are spaced slightly apart from each other along on the waveguide to allow the application of different voltages to the different electrodes, as is subsequently described. In alternative embodiments, electrode shapes other than right triangles may be used, including other types of triangles, or other polygons. In addition, the sides of the electrodes can be curved to produce focusing or variable bending of light rays passing therethrough. An example of an electrode having a curved shape is depicted in FIG. 14. The structurenof FIG. 14 is otherwise the same as the structure of FIG. 12, decribed below.

Since the light propagating in input side 130 is confined in waveguide $103b$, the waveguide core should have electro-optical properties. Cladding layers do not need to be from an EO material. Therefore, the top and bottom electrodes can be placed either directly on the core layer or on the cladding layers. Placing electrode directly on the core layer can result in optical losses due to metal absorption; however, placement directly on the core layer reduces the applied voltage necessary to create a required electric field. The specific configuration selected will depend on the structure of the deflector array, e.g., bulk material or thin films, as well as the system design requirements.

Referring to FIG. 5, each one of the upper electrodes $103_{kU}$ and the opposing and corresponding one of lower electrodes $103_{kL}$ defines a volume of electro-optical material waveguide $103b$ between the electrodes that, when energized with the application of appropriate voltage difference, forms one of the individual light deflection elements $103k$. Individual faces of deflection elements $103_k$ are indicated in the top view of FIG. 5 as faces 511, 513, 515, 517, 521, 523, 525, and 527. (Faces 511, 517, and 527 are also shown in FIG. 3.) Faces 511 to 527 extend through the thickness of waveguide 103b and are defined by adjacent edges of corresponding upper and lower electrodes. Thus for example, FIG. 5, illustrates a top, edge view of faces 511 and 513 that are defined by edges of upper electrode $103_{1U}$ and lower electrode $103_{1L}$, of faces 515 and 517 that are defined by edges of upper electrode $103_{2U}$ and lower electrode $103_{2L}$, of faces 521 and 523 that are defined by edges of upper electrode $103_{3U}$ and lower electrode $103_{3L}$, and of faces 525 and 527 that are defined by edges of upper electrode $103_{4U}$ and lower electrode $103_{4L}$. Note that with this arrangement of elements $103_k$, face 513 is adjacent and parallel to face 515, face 517 is adjacent and not parallel to face 519, and face 523 is adjacent and parallel to face 525.

The refraction of light propagating through waveguide 103b resulting from the application of a voltage difference across opposing electrodes $103_{kU}$ and $103_{kL}$ is due to refractive index changes along the light propagation path, which in turns depends on the shape of the electric field within the electro-optical material near the edges of the electrodes (such as at faces 511, 513, 515, 517, 521, 523, 525, and 527). In a conventional prism, the refractive index change is abrupt at the prism face, for example when light passes from air into a glass prism. Elements $103_k$ approximate a prism with faces having a steep, but not abrupt, refractive index change. Thus the refractive index change across each face 511, 513, 515, 517, 521, 523, 525, and 527 of opposing powered electrodes is steep, resulting in an element that approximates a conventional prism.

Further with reference to FIG. 5, an embodiment of light deflection elements $103_k$ is illustrated. Electrodes $103_{kL}$ and $103_{kU}$ have the shapes of right triangles, resulting in prism shaped elements $103_k$. In the embodiment of FIG. 5, elements $103_1$ and $103_3$ have the same size and shape, and elements $103_2$ and $103_4$ have the same size and shape. The relative positions of elements $103_1$ and $103_2$ of first prism pair 103p1 are the same as the relative positions of elements $103_2$ and $103_4$ of second prism pair 103p2. The orientation of prisms $103_k$ is best illustrated with reference to several lines of FIG. 5. Specifically, line 301 is aligned with input I, line 303 is at an angle α (corresponding to the deflection of curved waveguide 101 as depicted in FIG. 3) is normal to face 511, and a line 520 is normal to face 521 that is rotated from line 303 by an angle δ.

First prism pair 103p1 and second prism pair 103p2 are thus displaced and tilted, or rotated, as a prism pair by an angle δ, as are faces 513 and 515 between the elements of the first prism pair and faces 523 and 525 between the elements of the second prism pair. The angle of rotation δ may vary from channel-to-channel, as indicated by angle of rotation $δ_i$.

After passing through collimating lenses 102a and deflection elements $103_k$, the light then is directed into common waveguide 104 and towards output side 140. Specifically, common waveguide 104 includes a core 104a surrounded by cladding 104b, and the light is directed into core 104a, as shown in FIG. 3. Output side 140, as shown in FIG. 4, includes light deflection elements 105a that are similar to the input side light deflection elements 103a, formed from a slab-type waveguide 105b made from a material having electro-optic properties. The four light deflection elements $105_1$ through $105_4$ are arranged in two deflection element pairs, a first prism pair 105p1 including the first and second light deflection elements $105_1$ and $105_2$, and a second prism pair 105p2 including the third and fourth light deflection elements $105_3$ and $105_4$.

As with the input light deflection elements $103_k$, output light deflection elements $105_k$ comprise volumes within electro-optical material which changes optical properties by the application of a suitable electric potential. Thus the application of voltages to opposing electrodes $105_{kU}$ and $105_{kL}$ is used to controllably change the optical properties within the waveguide near the electrodes. The spacing and orientation of electrodes $105_{kL}$ and $105_{kU}$, and thus the shape of prism shaped elements $105_k$ is preferably a mirror image of input light deflection portion 103.

Operation of the First Embodiment

The operation and control of the deflection portions will now be discussed in greater detail. A controllable source of electrical potential (not shown) is coupled to the electrodes to activate the electro-optic material. Suitable controllable sources for applying electrical potentials to the electrodes are well known to those skilled in the art and need not be described in further detail. More specifically, when a voltage difference, ΔV, is applied across an upper and corresponding lower electrode, an electric field is established between the electrodes, extending through the thickness of waveguide 103b (into the plane of FIG. 5). Predominantly due to the electro-optic coefficient and thickness of waveguide 103b and the applied voltage difference, the refractive index of waveguide 103b is modified from a value of $n_o$ at zero applied voltage difference, to a value of $n_o+Δn$ within the prismatic volume of modified refractive index. The corresponding electrode edges of energized deflection elements are approximately step changes in the refractive index to light passing through the waveguide. As a result of the application of voltage differences to electrodes across deflection elements $103_k$, a refractive index changes are established across the planes defined by faces 511, 513, 515, 517, 521, 523, 525, and 527, deflecting the light accordingly. Similarly, the application of voltage differences across deflection elements $105_k$ deflects light through those elements.

FIGS. 6A–6D are top views of input side deflector of FIG. 3 illustrating, in general, a range of deflections which may be achieved by providing voltage differences to pairs of electrodes. The refractive index change due to the electro-optical effect depends on the orientation of the optical axis of the crystal (shown in FIG. 3),. the value of the electro-optic coefficient of material 103b, and the sign and magnitude of the voltage difference across the electro-optical material. For illustrative purposed, the plane of waveguide 103b is shown in FIG. 3 as being an x-y plane, where x is the primary direction of light beam propagation. The z direction contains the thickness of waveguide 103b, and has a positive direction from the lower to the upper electrodes (from $103_{kL}$ to $103_{kU}$). The voltage difference between electrodes is the upper electrode voltage minus the voltage of the lower electrode voltage (for example, the voltage of electrode $103_{1U}$ minus the voltage of electrode $103_{1L}$). A positive voltage difference (between electrodes $103_{1U}$ and $103_{1L}$, for example) results in a negative electric field in the light deflection element (element $103_1$, in this example) that is in the opposite direction to the crystal axis, and thus increases the refractive index of that element. It is understood that the direction and magnitude of the deflection of a light beam through waveguide 103 are a function of the relative orientation of the electric field and the crystal axis, the value of the electro-optic constant, the waveguide thickness, and the magnitude of the electric field.

FIGS. 6A–6D illustrate the effect of light deflection elements $103_k$ on beams traveling through waveguide 103b for different electric fields between electrodes. The term "voltage difference," as used herein, refers to the difference in voltage between a top electrode and a corresponding bottom electrode of a light deflection element, unless otherwise stated. The electrodes of the four light deflection elements $103_1$ to $103_4$ are grouped within each prism pair $103p1$ and $103p2$. The voltage difference for each light deflection element $103_k$ is indicated in FIG. 6 by "0," "+V," or "−V." It is preferred that the electrodes of first and second light deflection elements of each prism pair are provided with equal and opposite voltage differences, and that the voltage difference provided to each prism pair is separately controllable. Thus when a positive voltage difference is applied to one deflection element, a negative voltage difference is applied to the other deflection element of the same prism pair.

FIG. 6A illustrates the effect of providing voltage differences to the electrodes of the elements of first prism pair $103p1$ and no voltage difference to the electrodes of the elements of second prism pair $103p2$, deflecting an input ray $A_{in}$ into an output ray $A_{out}$. As shown in FIG. 6A, a minus and plus voltage difference is applied across light deflection elements $103_1$ and $103_2$ of the first prism pair $103p1$. Specifically, the indicated voltage difference −V of light deflection element $103_1$ represents a negative voltage difference of V between the upper electrode of element $103_1$, electrode $103_{1U}$, and the voltage of the lower electrode of element $103_1$, electrode $103_{1L}$. The indicated voltage difference of +V of light deflection element $103_2$ represents a positive voltage difference of V between the upper electrode of element $103_2$, electrode $103_{2U}$, and the voltage of the lower electrode of element $103_2$, electrode $103_{2L}$. In this state, indicated by the notation "−/+/0/0" to indicate the relative voltage differences of the four light deflecting elements, the refractive index of waveguide $103b$ at prism $103p1$ between the first upper electrode $103_{1U}$ and the first lower electrode $103_{1L}$ changes from n to n−Δn according to the strength of field E and the electro-optic properties of waveguide $103b$, and the refractive index of waveguide $103b$ between the second upper electrode $103_{2U}$ and the second lower electrode $103_{2L}$ changes from n to n+Δn. It is preferred that the faces 511 are perpendicular to line 303, and that faces 513 and 515 are parallel. Thus the transmission direction of ray $A_{in}$ is deflected away from line 303 by an angle γ, indicated as ray $A_{out}$, that increases with the voltage difference V according to the strength of the induced field E. In general, γ=γ(V), and Γ is a maximum deflection γ($V_{max}$), where $V_{max}$ is a maximum voltage difference applied to the electrodes of prism pair $103p1$.

FIG. 6B illustrates the effect of providing no voltage differences to electrodes of any of the light deflection elements of either the first prism pair $103p1$ or the second prism pair $103p2$, causing an input ray $B_{in}$ to pass undeflected as an output ray $B_{out}$. In this state, indicated by the notation "0/0/0/0," the refractive index of waveguide $103b$ at prisms $103p1$ and $103p2$ remains unchanged from the value of the surrounding waveguide, and the light passes through undeflected.

FIG. 6C illustrates the effect of providing voltage differences to the electrodes of the elements of first prism pair $103p1$ that are opposite to those illustrated in FIG. 6A, and no voltage difference to the electrodes of the elements of second prism pair $103p2$, deflecting an input ray $C_{in}$ into an output ray $C_{out}$. In this state, indicated by the notation "+/−/0/0," the refractive index of waveguide $103b$ at prism $103p1$ between the first upper electrode $103_{1U}$ and the first lower electrode $103_{1L}$ changes from n to n+Δn according to the strength of field E and the electro-optic properties of waveguide $103b$, and the refractive index of waveguide $103b$ between the second upper electrode $103_{2U}$ and the second lower electrode $103_{2L}$ changes from n to n−Δn. Thus the transmission direction of light is deflected away from line 303 by an angle γ, as shown in FIG. 6C, that increases with the voltage difference V. Prism pair $103p1$ is nearly symmetric about line 303, resulting in a maximum negative and positive deflection away from line 303. As in the discussion of FIG. 6A, γ=γ(V), and thus the maximum deflection for the application of voltage illustrated in FIG. 6C, Γ=−γ($V_{max}$).

The application of voltage differences of plus and minus V to the electrodes of first prism pair $103p1$ thus deflects an input beam by plus or minus γ relative to line 303. Thus, when maximum voltage differences are applied, an incident beam is deflected by plus or minus Γ. With light first deflected by first prism pair $103p1$ through an angle of −Γ, the second prism pair $103p2$ may be used to further deflect the light, as illustrated in FIG. 6D. Specifically, voltages differences of plus and minus $V_{max}$ are applied to the electrodes of the elements of the first prism pair $103p1$, deflecting the light by an angle of −Γ. The application of a positive voltage difference +V across the pair of electrodes $103_{3U}$ and $103_{3L}$ and a negative voltage difference −V across the pair of electrodes $103_{4U}$ and $103_{4L}$ results in the modification of the refractive index, as in the first prism pair $103p1$ as described with reference to FIG. 6A–6C. This state is referred to as "+/−/+/−." Second prism pair $103p2$ thus deflects light further away from line 303, according to the voltage V. As noted previously, the light deflection elements of first prism pair $103p1$ and second prism pair $103p2$ have similar size and shape, with the pairs displaced and rotated by an angle δ. Preferably −Γ=γ such that light deflected from line 301 by −Γ is normal to face 521. Second prism pair $103p2$ further deflects light to a total angle of −Γ−γ. When V=$V_{max}$, the total angle deflected by the first and second prism pairs is −2Γ. In a preferred embodiment, where the angle δ is the same as the angle −Γ, light can be controllably deflected from between +δ and −2δ. It is also preferred that $V_{max}$ is the same for each channel, and that each channel may have a different angle δ of $δ_i$.

In a preferred embodiment of the optical switching device of the present invention, there is a controller for applying voltages to the electrodes of elements $103_k$. In one embodiment, one electrode of each element $103_k$ is at electrical ground, and a voltage is applied to the other electrode. The controller, which may be a microprocessor (not shown in the drawings), is coupled to each of the electrodes of the light deflection elements through conductive paths that enable the application of suitably control voltages. It is to be understood that what is meant by the application of voltage differences is the application of voltages individually to electrodes, including the grounding of one or more electrodes, or the direct application of a voltage difference to the electrodes. In addition, the voltages may be applied individually to elements $103_k$, or can be applied to more than one element at a time by electrical connection between the electrodes of the elements.

The deflection of each of the inputs I in input side 130 is thus different and is controllable for each channel. Specifically, input $I_i$ is first deflected by an angle $α_i$ in waveguide 101-i, and is then deflected by an angle $γ_i$ that is controllably variable between a value of +$δ_i$ and −2$δ_i$ in deflection portion 103-i. For a waveguide 104 having the same refractive index as waveguide $103b$, input $I_i$ is thus deflected by an angle $α_i$+$γ_i$. In particular, the deflection from any input to any output is through an angle $θ_{ij}$. Thus it is preferred that the range $θ_{ij}$ for any particular input i ranges over the angle $θ_{ij}$ as the controllable deflection ranges from $+\delta_i$ and $-2\delta_i$, for example by ranging from $\theta_{i1}=\alpha_i+\delta_i$ to $\theta_{is}=\alpha_i-2\delta_i$. In one embodiment, varying the voltage difference to the electrodes of the elements of first prism pair 103p1 provides coverage of approximately two thirds of the output channels, and, with the maximum voltage applied to the first prism pair, varying the voltage difference to the electrodes of the elements of the second prism pair 103p2 provides coverage to the remaining third of the output channels.

The operation of the deflecting elements of output side 140 receiving output $O_j$ mirrors the operation of deflecting elements of input side 130 of input $I_i$ to produce a deflection in the opposite direction of the input deflection. FIGS. 6E-6H are top views of the output side deflector of FIG. 4 illustrating, in general, a range of deflections of deflectors of the present invention, with the electrodes of first element $105_1$, second element $105_2$, third element $105_3$, and fourth element $105_4$ having the following voltage differences: $-/+/0/0$ (FIG. 6E); $0/0/0/0$ (FIG. 6F); $+/-/0/0$ (FIG. 6G); and $+/-/+/-$ (FIG. 6H). The deflection according to these voltage differences is similar to that of input side 130, and is not repeated here. The light rays approaching output side 140 (rays $A_{in}$, $B_{in}$, $C_{in}$, or $D_{in}$) are directed by elements $105_k$ towards the output of switch 200.

Second Input and Output Side Embodiments

Second embodiments of an input side 830 and an output side 940 of an optical switch module of the present invention are shown in FIGS. 7, 8, 9, and 10. FIG. 7 is a top view of prisms 703p, along with a ray R in indicating the direction of light propagation through the optical switch, and FIG. 8 illustrates the range of deflections through input channel i (input side 803-i). FIG. 9 is a top view of prisms 903p, along with a ray R in indicating the direction of light propagation through module 800, and FIG. 10 illustrates the range of deflections through output channel j (output side 940-j). Input side 830 is shown as having an input side deflection portion 803, input side optical waveguide portion 101 and input side collimating portion 102. Output side 940 is shown as having an output side deflection portion 905, output side focusing portion 106, and output side waveguide portion 107. In the illustrated embodiment, the optical switch has 64 input channels, i, and 64 output channels, j.

The main difference between the input and output sides of the first embodiment and those of the second embodiment is the prism shape. Thus, the shape of prisms 703p differs from that of prisms 103p, and the shape of prisms 905p differs from that of prisms 105p. The orientation of the prisms and other components of input side 830 and output side 940 may thus differ slightly to provide coverage between the inputs I and outputs O. The operation of input side 830 and output side 940 with voltage differences to their respective electrodes is the same as the operation of input side 130 and output side 140.

Prisms 703p and 905p include four prisms each ($703_k$ and $905_k$, respectively, where k ranges from 1 to 4 corresponding to one of the four prisms) that form base prism units that are rotated to form the differing input and output portions (703-i, 905-j). In this embodiment, all adjacent sides of prisms 703p and of prisms 905p are parallel to minimize unwanted diffraction of light.

Referring to FIG. 7, prisms 703p include two pairs of deflection prisms each formed within waveguide 103b—a first prism pair 703p1 including a first deflection prism $703_1$ and a second deflection prism $703_2$, and a second prism pair 703p2 including a third deflection prism $703_3$ and a fourth deflection prism $703_4$. As in input deflection portion 103, each prism $703_k$ is defined by a pair of electrodes including an upper electrode $703_{kU}$ and an adjacent and corresponding lower electrode $703_{kL}$ separated by an EO material, as in FIG. 3. The view of lower electrode $703_{kL}$ is blocked by upper electrode $703_{kU}$, and is thus are not visible in FIG. 7 or 8.

Also shown in FIG. 7 are the individual faces of deflection elements $703_k$, indicated as faces 711, 713, 715, 717, 721, 723, 725, 727. Faces 711 through 727 include a thickness of waveguide 103b and are defined by edges of an upper and corresponding lower electrode. As noted previously, the adjacent faces of adjacent prisms are parallel—specifically face 713 is parallel to face 715, face 717 is parallel to face 721, and face 723 is parallel to face 725. The rotational relationship between the various faces is be seen by reference to a line 710 normal to the input of the first prism pair 703p1 (face 711) and a line 720 normal to the input of second prism pair 703p2 (face 721). It is preferred that lines 710 and 720 meet an angle $\Gamma$, which is the maximum deflection angle of prism pair 703p1 as discussed below. Thus surfaces 713 and 715 are parallel and tilted with respect to surfaces 723 and 725, and surfaces 717 and 721 are parallel. The parallel arrangement of adjacent surfaces minimizes light diffraction between prisms.

It is preferred that the electrodes of first and second light deflection prisms of each prism pair are provided with equal and opposite voltage differences, ranging from $V=-V_{max}$ to $V=+V_{max}$, and that the voltage differences provide to each prism pair are separately controllable, as was discuss previously with reference to FIG. 6. Thus the voltage difference across prism $703_1$ is equal and opposite to the voltage difference across prism $703_2$, and the voltage difference across prism $703_3$ is equal and opposite to the voltage difference across prism $703_4$, and the maximum deflection angle through a prism pair 703p1 or 703p2 pair is $\Gamma$. The notation $-/+/0/0$, $+/-/0/0$, and $+/-/+/-$ and the deflection of light illustrated in FIG. 8 corresponds to the deflection based on the application of voltage differences in pairs of prisms $703_k$ analogous to the application of voltage differences across elements $103_k$ as discussed with reference to of FIG. 6.

Each input side deflection portion 803-i includes an arrangement of prisms 703p that are rotated by an angle $\alpha_i$ from input $I_i$, such that prisms 703p can deflect light from input $I_i$ over a range of angles $\theta_{i-j}$ to deflect input i to any required output j. Input side 830 accepts an input $I_i$ and controllably deflects the light towards output j along a ray $R_{ij}$ at an angle $\theta_{i-j}$ from the direction of input $I_i$. As an example, the output rays are shown being directed in thirds according to the operation of input side 830 (outputs j of 1 through 19, 20 through 42, and 43 through 64). Examples of several rays $R_{i-j}$ are shown in FIG. 8 as an upper ray $R_{i-1}$ that is directed to output channel 1 at an angle $\theta_{i-j}$, an intermediate ray $R_{i-19}$ directed towards output channel 19 at an angle $\theta_{i-19}$, another intermediate ray $R_{i-42}$ directed towards output channel 42 at angle $\theta_{i-42}$, and a lower ray $R_{i-64}$ directed towards output channel 64 at an angle $\theta_{i-64}$.

The range of deflections for input i are shown in FIG. 8 as the cross-hatched range bound by ray $R_{i-1}$ and $P_{i-64}$. Note that in addition to the deflection in light deflection portion 830, the light is further deflected at waveguide input 135 due to the decrease in the refractive index from waveguide 130b to waveguide 104.

With reference to FIG. 8, deflection of input $I_i$ deflects the input at channel i to a selected one of the j output channels. As would be apparent to one skilled in the art, the angle $\theta_{i-1}$ through common waveguide 104 depends on the overall geometry of the switching module and the optical properties of the waveguides. The angles can be calculated using ray tracing procedures. In the preferred embodiment, three voltage schemes are used, i.e., −/+/0/0, +/−/0/0, and +/−/+/−. Each of these provides an approximately equal deflection range, therefore it is preferred that voltages according to each of these schemes covers directs the input to an upper, middle, and lower third of the output channels. Thus preferably application of voltage difference to only the first prism pair 703p1 as −/+/0/0 is used to deflect light between ray $R_{i-1}$ (when the magnitude of the voltage difference across prism $703_1$ is a minimum ($-V_{max}$) and across prism $703_2$ is a maximum ($+V_{max}$)), to a ray $R_{i-19}$ when a zero voltage difference is applied to prism pair 703p1 Reversing the voltage difference applied as +/−/0/0 deflects the rays further, to a ray $R_{i-42}$ when voltage difference across prism $703_1$ is a maximum ($+V_{max}$) and across prism $703_2$ is a minimum ($-V_{max}$). With the voltage differences across prism pair 703p1 maintained at $+V_{max}$ across prism $703_1$ and $-V_{max}$ across prism $703_2$, the voltage difference across the second prism pair 703p2 can be increased as +/−/+/− to further controllably deflect the light towards ray $R_{i-64}$, which occurs when the voltage difference across prism $703_3$ is $+V_{max}$ and across prism $703_4$ is $-V_{max}$.

The angle Γ is selected to reduce unwanted deflections between prism pairs 703p1 and 703p2. Specifically, light deflection portion 803 deflects either through the first prism pair 703p1 or by the combined deflection of both prism pairs 702p. In addition, the second prism pair 703p2 only deflects when the first prism pair 703p1 is at a maximum deflection (deflecting an incident ray by an angle Γ in the direction of line 720). Since the normal to faces 717 and 721 are also angled by angle Γ from the normal to face 711, the light is incident normally to faces 717 and 721.

The output prisms 903p are a mirror image in both construction and operation of input prisms 703p. As shown in FIG. 9 are the individual faces of deflection elements $905_k$, indicated as faces 911, 913, 915, 917, 921, 923, 925, 927, and a line 910 normal to the input of the first prism pair 905p1 (face 911) and a line 920 normal to the input of second prism pair 905p2 (face 921). It is preferred that lines 910 and 920 meet an angle Γ, which is the maximum deflection angle of prism pair 905p1.

A preferred output deflection portion 905 of an output side 940, including output side optical waveguide portion 107 and output side focusing portion 106, is illustrated with reference to FIGS. 9 and 10. Along with a ray R indicating the direction of light travel from input side 130 to output side 140, FIG. 9 illustrates a basic prism arrangement for the output deflection portion, and FIG. 10 is a schematic of one output deflection portion 903 as input deflection portion 903-i. As shown in FIG. 10, output side 930 accepts a ray $R_{i-j}$ at an angle $\theta_{i-j}$; from the direction of input $I_i$ and controllably deflects the light towards output j. Examples of several rays $R_{i-j}$ are shown in FIG. 10 as an upper ray $R_{1-j}$ that is directed from input channel 1 at an angle $\theta_{1-j}$, an intermediate ray $R_{19-j}$ directed from input channel 19 at an angle $\theta_{19-j}$, an intermediate ray $R_{42-j}$ directed from input channel 42 at angle $\theta_{42-j}$, and a lower ray $R_{64-j}$ directed from input channel 64 at an angle $\theta_{64-j}$.

Deflection through prism pairs 905p1 and 905p2 are controlled in the same manner as prisms 105p. Specifically, each output side deflection portion 905-i includes an arrangement of prisms 905p that are rotated by an angle $\beta_j$ from output $O_j$, such that prisms 905p can controllably deflect light from any input $I_i$ toward output $O_j$. The range of deflections are shown in FIG. 10 as the cross-hatched range bound by ray $R_{1-j}$ and $R_{64-j}$. The prisms of each prism pair are provided with equal and opposite voltage differences.

Thus application of voltage difference to only the first prism pair 905p1 as −/+/0/0 deflects light between ray $R_{1-j}$ (when the magnitude of the voltage difference across prism $905_1$ is a minimum ($-V_{max}$) and across prism $905_2$ is a maximum ($+V_{max}$)), to a ray $R_{19-j}$ when a zero voltage difference is applied to prism pair 905p1. Reversing the voltage difference applied as +/−/0/0 deflects the rays further, to a ray $R_{42-j}$ when voltage difference across prism $905_1$ is a maximum ($+V_{max}$) and across prism $905_2$ is a minimum ($-V_{max}$). With the voltage differences across prism pair 905p1 maintained at $+V_{max}$ across prism $905_1$ and $-V_{max}$ across prism $905_2$, the voltage difference across the second prism pair 905p2 can be increased as +/−/+/− to further controllably deflect the light towards ray $R_{64-j}$, which occurs when the voltage difference across prism $905_3$ is $+V_{max}$ and across prism $905_4$ is $-V_{max}$.

An example of an optical switching module is illustrated with reference to FIGS. 11 to 13. In one embodiment the switch is a cross-connect switch comprising 64 channels. A pitch, P, of inputs $I_i$ and $O_j$ is 0.5 mm for width W of 32 mm, the common waveguide 104 length L(WG) is 84.47 mm, and the length of input side 830 and output side 930 are L(IN)=L(OUT)=2.0 mm. The waveguides 103b and 105b are PLZT with a refractive index of 2.4, and the maximum change in refractive index within deflection portions 803 and 905 due to electro-optic effects is 0.04 for a voltage difference that corresponds with an electric potential of 10 V/micrometers, and the refractive index of waveguide 104 is 1.54. Details of prisms 703p are shown in FIG. 12, along with a length scale, where the angle Γ is 1.65 degrees. Prisms 905p are a mirror image of prisms 703p about a line between the input and outputs.

Each input side 830-i directs signals to one of the output sides using the 31/+/0/0, +/−/0/0, +/−/+/− control scheme described previously, where −/+/0/0 provides coverage to channels 1-19, +/−/0/0 provides coverage to channels 20–42, and +/−/+/− provides coverage to channels 43–64. The amount of tilt, $\beta_i$, required for prisms 703p varies linearly with the channel number, as shown in FIG. 13. The asymmetric variation of tilt from channel 1 to channel 64 is the result of the asymmetric deflection of light by prism 703p, with a deflection angle of +Γ to zero degrees for −/+/0/0, a deflection angle of zero degrees to −Γ for +/−/0/0, and a deflection angle of −Γ to −2 for +/−/+/−.

The previous embodiment uses prisms 703p having the same shape for each channel. In an alternative embodiment, the individual deflection elements comprising prism 703p, are tilted from channel-to-channel to provide more symmetric coverage of the output channels. Thus for example, the prisms 703p of the channel at on one side of the switch (channel 1) are the mirror image, about the centerline of the switching module, of the prisms of the channel on the opposite side of the switch (channel 64). In another alternative embodiment, the individual deflection elements comprising prism 703p, are tilted from channel to channel, and the shapes of the individual deflection elements adjusted to maintain parallel adjacent surfaces.

The present invention thus includes deflectors having a tilted arrangement that provide for controllable deflection of light. The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. For example, while the present invention describes the use of silicon to form the substrate, other materials including glass or ceramics may be used. In addition, the light deflecting elements can have other geometries for deflecting light, as is generally known in the art, produced using electro-optical materials as described herein. Optical switching modules including the light deflecting elements of the present invention can include such elements on some or all of the input channels, or on none or all of the output channels. Accordingly, the disclosures and descriptions herein are intended to be illustrative, but not limiting, of the scope of the invention, which is set forth in the following claims.

What is claimed is:

1. An optical deflection device for diverting the direction of light rays comprising:
a plurality of deflecting elements comprising a first pair of deflecting elements and a second pair of deflecting elements, where each deflecting element comprises an electro-optical material and is defined by two electrodes of similar shape on opposite sides of said electro-optical material, such that the index of refraction of said electro-optical material is controllably adjustable by applying a voltage difference to said electrodes,
where each pair of deflecting elements has a generally longitudnial axis and the axis of said first pair of deflecting elements and the axis of said second pair of deflecting elements are in a tilted relationship.

2. The optical deflection device of claim 1, wherein adjacent surfaces of said first pair of deflecting elements are planar and parallel, and wherein adjacent surfaces of said second pair of deflecting elements are planar surfaces and parallel.

3. The optical deflection device of claim 2, wherein adjacent surfaces between said first pair of deflecting elements and said second pair of deflecting elements are planar and parallel.

4. The optical deflection device of claim 1, wherein said electrodes are triangular.

5. The optical deflection device of claim 1, wherein the edges of each electrode are straight.

6. The optical deflection device of claim 1, wherein at least one edge of at least one electrode is curved.

7. The optical deflection device of claim 1, wherein said electro-optical material is PZT, PLZT, or LN.

8. The optical deflection device of claim 1, wherein said first pair of deflecting elements and said second pair of deflecting elements have the same shape.

9. The optical deflection device of claim 2, wherein adjacent surfaces between said first pair of deflecting elements and said second pair of deflecting elements are planar and parallel, and wherein said first pair of deflecting elements and said second pair of deflecting elements have the same shape.

10. An optical switching module comprising:
an input side having one or more input channels each adapted to accept an optical input;
an output side having a plurality of output channels each adapted to deliver an optical output; and
a common waveguide disposed between said input side and said output side,
where at least one input channel comprises a plurality of deflecting elements comprising a first pair of deflecting elements and a second pair of deflecting elements, said pairs of deflecting elements having first and second generally longitudinal axes, respectively, and wherein said first and second axes are in a tilted relationship.

11. The optical switching module of claim 10, wherein each deflecting element comprises an electro-optical material and is defined by two electrodes of similar shape on opposite sides of said electro-optical material, such that the index of refraction of said electro-optical material is controllably adjustable by applying a voltage difference to said electrodes.

12. The optical switching module of claim 10, wherein adjacent surfaces of said first pair of deflecting elements are planar and parallel, and wherein adjacent surfaces of said second pair of deflecting elements are planar surfaces and parallel.

13. The optical switching module of claim 12, wherein adjacent surfaces between said first pair of deflecting elements and said second pair of deflecting elements are planar and parallel.

14. The optical switching module of claim 11, wherein said electrodes are triangular.

15. The optical switching module of claim 11, wherein the edges of each electrode are straight.

16. The optical switching module of claim 11, wherein at least one edge of at least one electrode is curved.

17. The optical switching module of claim 11, wherein said electro-optical material is PZT, PLZT, or LN.

18. The optical switching module of claim 10, wherein said first pair of deflecting elements and said second pair of deflecting elements have the same shape.

19. The optical switching module of claim 12, wherein adjacent surfaces between said first pair of deflecting elements and said second pair of deflecting elements are planar and parallel, and wherein said first pair of deflecting elements and said second pair of deflecting elements have the same shape.

20. The optical switching module of claim 10, wherein the refractive index of said common waveguide is less than the refractive index of said input side and the refractive index of said output side.

21. A method for deflecting light beams in an optical switching module having an input side with one or more input channels each adapted to accept an optical input, an output side with a plurality of output channels each adapted to deliver an optical output, and a common waveguide disposed between said input side and said output side, where at least one input channel comprises a plurality of deflecting elements comprising a first pair of deflecting elements having a first generally longitudinal axis and a second pair of deflecting elements having a second generally longitudinal axis, where said first and second axes are in a tilted relationship, said method comprising:
controlling the deflection of a light beam at said input side from a selected input channel to a selected output channel by applying different voltages to said first pair of deflecting elements and said second pair of deflecting elements.

22. The method of claim 21, wherein said controlling further includes applying a voltage to said first pair of deflecting elements to deflect a selected input to one of approximately two thirds of said plurality of optical channels.

23. The method of claim 22, wherein said controlling further includes applying a voltage to said first pair of deflecting elements and to said second pair of deflecting elements to deflect a selected input to one of approximately one third of said plurality of optical channels.

24. The method of claim 21, wherein at least one output channel comprises a plurality of deflecting elements comprising a third pair of deflecting elements and a fourth pair of deflecting elements in a tilted relationship, said method further comprising:
controlling the deflection of a light beam at said output side from a selected input channel to a selected output channel by applying different voltages to said third pair of deflecting elements and said fourth pair of deflecting elements.

25. The method of claim 24, wherein said controlling the deflection at said output side further includes applying a voltage to said third pair of deflecting elements to deflect a selected input to one of approximately two thirds of said plurality of optical channels.

26. The method of claim 25, wherein said controlling the deflection at said output side further includes applying a voltage to said third pair of deflecting elements and to said fourth pair of deflecting elements to deflect a selected input to one of approximately one third of said plurality of optical channels.

27. An optical deflection device for diverting the direction of light rays in a controllable light path through a slab of electro-optical material comprising:
a plurality of deflecting electrodes mounted on said slab comprising a first deflecting electrode adjacent to a first position in a light path and a second deflecting electrode adjacent to a second position in said light path, said first and second electrodes being separately coupled to an adjustable electrical potential to cause deflection of said light rays;
wherein each of said first and second deflecting electrodes has a generally longitudinal axis and wherein the axis of said first deflecting electrode and the axis of said second deflecting electrode are in a tilted relationship.

* * * * *